(12) United States Patent
Renner et al.

(10) Patent No.: US 6,223,984 B1
(45) Date of Patent: *May 1, 2001

(54) DISTINCT SMART CARD READER HAVING WIEGAND, MAGNETIC STRIP AND BAR CODE TYPES EMULATION OUTPUT

(75) Inventors: G. Fred Renner; Randall E. Johnson, both of Dublin; Caroline Chu-Jeng, Columbus, all of OH (US)

(73) Assignee: Cybermark, Inc., Washington, DC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/870,597

(22) Filed: Jun. 6, 1997

Related U.S. Application Data

(62) Division of application No. 08/414,495, filed on Mar. 31, 1995, now Pat. No. 5,679,945.

(51) Int. Cl.[7] ................................................ G06K 5/00
(52) U.S. Cl. ............................................ 235/380; 235/487
(58) Field of Search .................................... 235/492, 487, 235/449, 451, 380, 381; 902/26, 22

(56) References Cited

U.S. PATENT DOCUMENTS

| | | | |
|---|---|---|---|
| Re. 33,571 | 4/1991 | Takahashi | 235/380 |
| 3,932,843 | 1/1976 | Trelut et al. | 395/500 |
| 4,612,436 | 9/1986 | Okada | 235/492 |
| 4,650,981 | 3/1987 | Foletta | 235/492 |
| 4,701,601 | 10/1987 | Francini et al. | 235/492 |
| 4,709,137 | 11/1987 | Yoshida | 235/379 |
| 4,727,244 | 2/1988 | Nakano et al. | 235/388 |
| 4,767,920 | 8/1988 | Kitta et al. | 220/273 |
| 4,791,283 | 12/1988 | Burkhardt | 235/492 |
| 4,891,727 | 1/1990 | Sato et al. | 235/440 |
| 4,960,983 | 10/1990 | Inove | 235/492 |
| 4,961,142 | 10/1990 | Elliott et al. | 235/380 |
| 5,012,077 | 4/1991 | Takano | 235/380 |
| 5,036,461 | 7/1991 | Elliott et al. | 705/44 |

(List continued on next page.)

FOREIGN PATENT DOCUMENTS

| | | | |
|---|---|---|---|
| 4202998 | 8/1993 | (DE) | 235/492 |
| 0 282 992 | 9/1988 | (EP) | 235/449 |
| 0 490 455 A2 | 6/1992 | (EP) . | |
| 0 534 718 A2 | 3/1993 | (EP) . | |
| 0 574 006 A1 | 12/1993 | (EP) . | |
| 2 248 126 | 3/1992 | (GB) . | |
| 2 273 222 | 6/1994 | (GB) . | |
| 3 194 680 | 8/1991 | (JP) | 235/486 |
| 4-360296 | 12/1992 | (JP) | 235/486 |
| 6-119501 | * 4/1994 | (JP) . | |
| WO 89672 | 2/1989 | (WO) . | |
| WO 92/12480 | 7/1992 | (WO) . | |

*Primary Examiner*—Karl D. Frech
(74) *Attorney, Agent, or Firm*—Porter, Wright, Morris & Arthur

(57) ABSTRACT

An intelligent card reader is provided to replace existing magnetic stripe readers, bar code readers, and Wiegand effect readers without the need for expensive retrofitting of existing computer systems which are coupled to the existing readers. The intelligent card reader can replace the aforementioned readers and yet remain compatible with their existing interfaces by emulating a magnetic card reader, a Wiegand effect reader, or a bar code reader. Moreover, the card reader can accept smart cards having different functions and/or software interfacing techniques, thus allowing different types of smart cards can be used in the same reader. A reprogramming feature allows the unit to be easily reprogrammed to support new features and smart card types without rewiring or removing the unit.

54 Claims, 15 Drawing Sheets

U.S. PATENT DOCUMENTS

| | | | |
|---|---|---|---|
| 5,070,233 | 12/1991 | Takizawa et al. | 235/380 |
| 5,128,523 | 7/1992 | Diehl et al. | 235/492 |
| 5,149,945 | 9/1992 | Johnson et al. | 235/380 |
| 5,212,369 | 5/1993 | Karlisch et al. | 235/380 |
| 5,258,604 | 11/1993 | Behrens et al. | 235/462 |
| 5,288,980 * | 2/1994 | Patel et al. | 235/381 |
| 5,309,251 | 5/1994 | Terajima | 358/444 |
| 5,327,018 | 7/1994 | Karlish et al. | 327/415 |
| 5,338,923 | 8/1994 | Grieu | 235/492 |
| 5,349,649 | 9/1994 | Iijima | 395/275 |
| 5,375,037 | 12/1994 | Le Roux | 235/492 |
| 5,382,778 * | 1/1995 | Takahira et al. | 235/381 |
| 5,420,412 | 5/1995 | Kowalski | 235/492 |
| 5,450,938 * | 9/1995 | Rademacher | 235/381 |
| 5,491,326 * | 2/1996 | Marceau et al. | 235/381 |
| 5,578,808 * | 11/1996 | Taylor | 235/380 |
| 5,641,050 * | 6/1997 | Smith et al. | 235/381 |
| 5,679,945 * | 10/1997 | Renner et al. | 235/492 |

* cited by examiner

DISTINCT SMART CARD READER HAVING WIEGAND, MAGNETIC STRIP AND BAR CODE TYPES EMULATION OUTPUT

This application is a divisional of application Ser. No. 08/414,495, filed Mar. 31, 1995 now U.S. Pat. No. 5,679,945.

BACKGROUND OF THE INVENTION

1. Technical Field

This invention relates generally to card readers which accept and interact with microprocessor-equipped cards (e.g., so-called "smart cards"). In particular, the invention provides a card reader which accepts different types of smart cards and emulates various peripheral devices such as magnetic stripe readers, bar code readers, and Wiegand effect readers.

2. Related Information

The need to store information in a portable and compact form has led to the development of various types of storage media and peripheral devices which interact with the storage media. For example, cards containing magnetic stripes have been developed to store a customer's bank account information, so that the customer can insert the magnetic card into an ATM machine and have certain information quickly and automatically exchanged with a bank. Similarly, Wiegand-effect cards containing a plurality of special wires have been used to store pre-coded information onto a portable card which can then be inserted into a suitable reader, which upon activation by the card unlocks a door or activates a parking garage gate. Well-known bar code technology allows a library patron's account information to be quickly entered and correlated with bar-coded books to be checked out from the library. These various media and reader devices have proliferated into numerous applications such as cafeteria meal plans, access control, and point-of-sale credit and debit transactions. Unfortunately, the media are incompatible with each other, resulting in the need for each customer to maintain several different cards for a bank, library, parking garage, and the like.

More recently, microprocessor-equipped cards ("smart cards") have been developed to allow larger quantities of information to be stored onto a single medium. Various manufacturers now provide different types of smart cards with different memory sizes, microprocessor types, and operating systems. The development of these cards can provide the basis for eliminating different types of information media altogether and consolidating different types of information on a single card.

Unfortunately, existing systems which support magnetic cards, bar-code stripes, and Wiegand effect cards cannot be easily retrofitted to use the newer smart cards. For example, replacing a cafeteria plan system which reads magnetic cards would require the replacement of the card reading terminals and the installation of a new type of terminal which could interact with the smart cards. Additionally, expensive and time-consuming software changes would be required in the central computer to interact with the smart cards. Thus, there exists a problem in transitioning existing systems to newer smart card technology.

Even if existing systems can be transitioned to smart card technology, there remains a problem of incompatibility among different types of smart cards. For example, different smart card vendors, while providing cards which generally comply with an ISO standard for electrical contacts and the like, unfortunately have failed to ensure that all cards provide a standard set of functions or software interfaces which can be used across different vendors' cards. In other words, designing a card reader to work with one vendor's smart cards will not ensure that another vendor's smart cards can be used in the reader. Other inventors have proposed features which would allow certain hardware-specific differences to be accommodated (see, e.g., U.S. Pat. No. 5,070,233, which proposes a circuit allowing different clock frequencies among smart cards to be used). However, more serious incompatibilities remain in that different operating systems, functions, and software interfacing techniques are used across different vendors' smart cards. For example, one vendor's cards may provide certain file security features, while another vendor's cards do not, or provide them in a different (and incompatible) manner. One vendor's cards may provide on-card stored-value purse debit and credit functions, while another vendor's cards do not. One vendor's cards may provide file-level access features, while another vendor's cards do not. These incompatibilities present a barrier to using the newer smart card technology, because integrators may become dependent on a particular vendor for smart cards, preventing price reductions due to lack of competition. Accordingly, there exists a problem in that remaining incompatibilities across smart card vendors inhibit the use of a standard interfacing technique for smart cards.

Finally, conventional smart card readers cannot be readily modified to add new features. Adding new features or compatibility modes typically requires changes to the card reader hardware or requires that the unit be removed for servicing. Thus, modifications become expensive and inconvenient.

SUMMARY OF THE INVENTION

The present invention solves the aforementioned problems by providing an intelligent card reader which can replace existing magnetic stripe readers, bar code readers, and Wiegand effect readers without the need for expensive retrofitting of existing computer systems which are coupled to the existing readers. In particular, it is one object of the present invention to provide an intelligent card reader which can replace the aforementioned readers and yet remain compatible with their existing interfaces by emulating a magnetic card reader, a Wiegand effect reader, or a bar code reader. In various embodiments, the present invention thus allows smart cards to be used with existing systems while retaining the infrastructure of the existing systems.

The present invention also solves the aforementioned problems by providing an intelligent card reader which can accept smart cards having different functions and/or interfacing techniques. It is thus another object of the present invention to provide a smart card reader which can overcome such differences in functions and interfacing techniques, so that different types of smart cards can be used in the same reader.

It is a further object of the present invention to provide an intelligent card reader which can be easily reprogrammed to support new features and smart card types without rewiring or removing the unit.

As shown in FIG. 1A, a conventional bar-code based library book check-out system comprises a library computer 100 which receives input from a bar code reader 101. A library patron provides a bar-coded card 102 to a library staff member, who swipes the card in bar code reader 101, which may be a wand-type device or a scanning laser device. Each book 103 to be checked out by the patron includes a bar code label 104 which is also scanned by bar code reader 101. In this manner, library computer 100 quickly and accurately receives information pertaining to each book check-out operation. Library computer 100 may be connected to other computers, and it may accept input from more than one bar code reader. It is one object of the present invention to provide user account information by way of a smart card reader instead of bar code reader 101, without the need to modify or replace library computer 100. Thus, there would be no need for a separate user bar-coded card 102.

FIG. 1B shows a conventional access control application which makes use of a Wiegand effect card reader. Access to door 106 is controlled by Wiegand effect card reader 107, which operates a locking device (not shown). Access control computer 105, which may be coupled to more than one Wiegand effect reader, stores information regarding authorized cards which may be used to open door 106. A user tenders a Wiegand effect card 108 into card reader 107, which reads the precoded information on the card and transmits the information to access control computer 105. If the precoded information matches information stored in access control computer 105, door 106 is unlocked to allow access to the user. It is one object of the present invention to allow Wiegand effect reader 107 to be replaced with a smart card reader (and Wiegand effect card 108 to be replaced with a smart card), without the need to modify or replace existing access control computer 105.

FIG. 1C (top half) shows a conventional magnetic card-based cafeteria meal plan such as may be implemented on a college campus or point-of-sale terminal. The amount of a meal or sale is rung up on cash register 110. For payment, the user tenders card 112 which includes a magnetic stripe containing account information pertaining to the user. The card is "swiped" through magnetic stripe reader 111, which reads the magnetic stripe and provides the account information to cash register 110, which may in turn transmit an authorization request signal to a central computer 109. If the meal or other sale is authorized, central computer 109 debits the user's account and authorizes the transaction. It is an object of the present invention to allow magnetic stripe reader 111 to be easily replaced by a smart card reader without modifying cash register 110 or computer 109.

Referring again to FIG. 1C (bottom half), magnetically striped card 112 may instead be inserted into a magnetic stripe reader 113 which is coupled to or part of an Automatic Teller Machine (ATM) 114. In the latter case, bank account information stored on the magnetic stripe is read from the card into ATM 114 and subsequently provided to bank 115 via an on-line transaction. It is a further object of the present invention to allow the magnetic stripe reader 113 to be replaced with a smart card reader, without making major modifications to ATM 114.

Various other objects and advantages of the present invention will become apparent through the following detailed description, figures, and the appended

DETAILED DESCRIPTION OF THE PREFERRED EMBODIMENTS

This is a Divisional Application of Application Ser. No. 08/414,495, filed Mar. 31, 1995, now U.S. Pat. No. 5,679,945.

Figure 2:
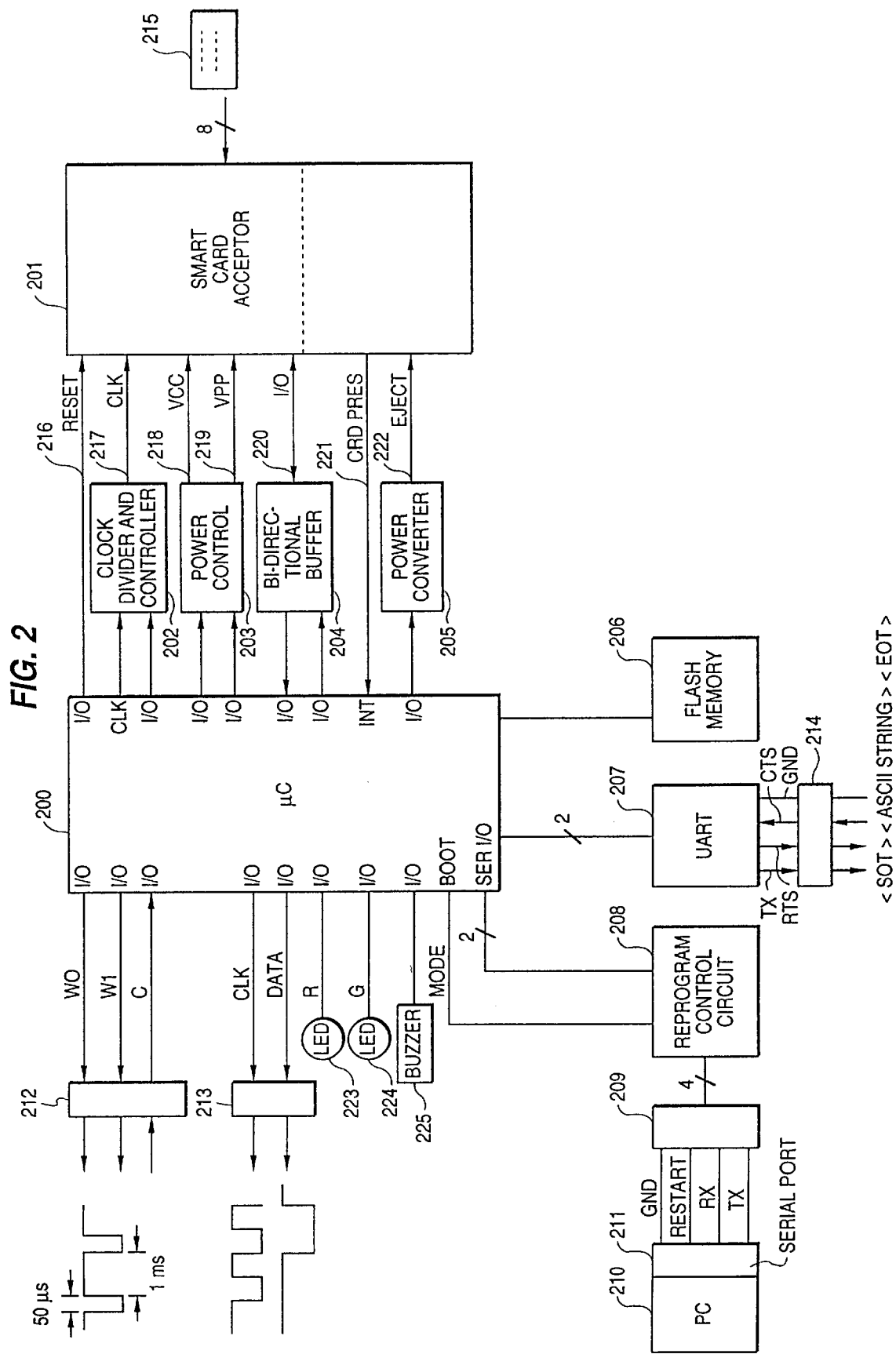
FIG. 2 shows various embodiments of an intelligent card reader according to the present invention.

FIG. 2 shows an intelligent card reader in accordance with various embodiments of the present invention. A microcontroller (or microprocessor) 200, which may for example comprise the well-known 68HC11 device, is operatively coupled to a card acceptor 201 through interface circuits described in more detail below. Card acceptor 201 may comprise an Amphenol "push-pull" model, an Amphenol "pushmatic" model, a Hopt+Schuler model 846, or any of various other commercially available card acceptors. Card acceptor 201 mechanically accepts a microprocessor-equipped smart card 215 having electrical contacts established in accordance with well known ISO standards. Smart card acceptor 201 preferably couples the electrical contacts on smart card 215 with appropriate output terminals, including an I/O output terminal 220 through which data is transmitted to and from smart card 215. Generally, each of the 8 electrical contact pads is coupled to an output terminal on smart card acceptor 201 as shown in FIG. 2.

A nonvolatile memory 206 is coupled to microcontroller 200 for storing programs which may be executed by the microcontroller. A reprogramming control circuit 208 allows the microcontroller to be reprogrammed through a reprogramming interface 209, such as through a PC 210 having a serial port 211. A Universal Asynchronous Receiver/Transmitter (UART) 207 may also be provided to support RS-232 features.

The interface circuitry which couples microcontroller 200 to smart card acceptor 201 will now be described in more detail. A reset signal generated at an I/O pin on the microcontroller is used to reset smart card 215 through reset line 216. A clock divider and controller circuit 202 divides a clock output of microcontroller 200 to a lower frequency (such as 1.8 MHz) suitable for the smart card being used. An I/O pin on microcontroller 200 may be used to start, stop, and control the clock signal which is provided to smart card 215 via clock line 217. A power control circuit 203 is coupled to the Vcc and Vpp lines, respectively, of card acceptor 201, which provides these lines to corresponding electrical pads on smart card 215. In various embodiments, Vcc and Vpp may be provided at the same voltage level (one of ordinary skill in the art will recognize that older smart cards often require different voltage levels while newer cards can operate at the same external voltage level). Power control circuit 203 may also be enabled by I/O pins on microcontroller 200 in response to software operating in the microcontroller. Bi-directional buffer circuit 204 acts to convert the single I/O line 220 from the smart card into two separate unidirectional I/O lines on the microcontroller. A ground line (not shown) grounds one of the pins on smart card 215 in common with the microcontroller ground. Two of the 8 contact pads on the smart card are not used in various embodiments of the present invention.

In various embodiments, smart card acceptor 201 may be equipped with a "card present" signal line 221 which is energized in response to the insertion of smart card 215. This line may be used to drive an interrupt line on microcontroller 200 as shown in FIG. 2. A card eject feature may also be provided in smart card acceptor 201, which is controlled by microcontroller 200 through power converter 205. In response to a command from microcontroller 200 and a corresponding signal on line 222, card acceptor 201 ejects a smart card typically using a solenoid. The dotted line in smart card acceptor 201 in FIG. 2 illustrates that the "card present" and "eject" signals are interfaces to the card acceptor itself and not to the smart card.

Although the present invention generally contemplates that the intelligent card reader shown in FIG. 2 will operate to convert data stored on smart card 215 into either a Wiegand effect signal, a magnetic stripe signal, or a bar code signal, circuitry is shown in FIG. 2 for implementing all three types of emulated signals. Thus, a Wiegand output terminal 212 is provided for emulating Wiegand effect signals, a magnetic stripe output terminal 213 is provided for emulating a magnetic stripe signal, and a bar code output terminal 214 is provided for emulating a bar code signal. One of ordinary skill in the art will recognize that preferably only one, and not all three, of these outputs is needed to accomplish the objects of the invention. It is well within the scope of the present invention, however, to simultaneously provide all three types of outputs if desired.

The power-up sequence used for interacting with smart card 215 is well known and is not described here in detail. Briefly, when a smart card is inserted into card acceptor 201, a "card present" signal is generated on line 221 which interrupts microcontroller 200. At that point, microcontroller 200 provides power and clock signals via lines 217, 218 and 219 respectively, and generates a reset signal via reset line 216. In response to the reset signal, smart card 215 generates an "answer-to-reset" data packet which includes information describing the card (see discussion below pertaining to card compatibility features). Thereafter, microcontroller 200 generates various commands via I/O line 220 and receives responses thereto from smart card 215. Examples of various smart cards which may be used are the commercially available GEMPLUS MPCOS™ or PCOS™ cards, the Schlumberger ME2000, or Giesecke & Devrient STARCOS cards.

Device Emulation Features

Figure 1:
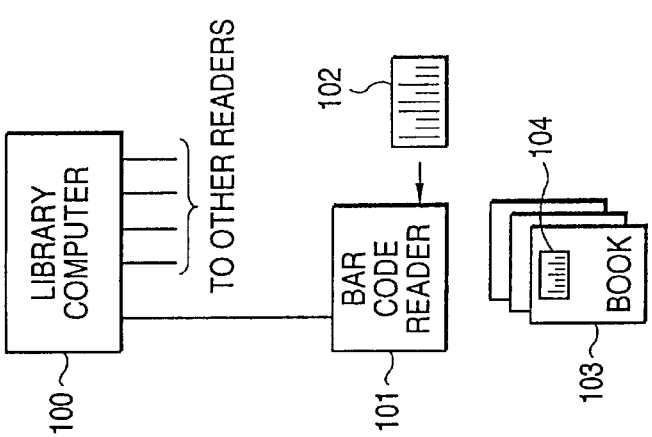
FIG. 1A shows a conventional library computer system which uses bar code technology to keep track of books checked out by library patrons.
FIG. 1B shows a conventional access control system which uses Wiegand-effect cards to verify access to a locked door.
FIG. 1C shows a conventional cafeteria plan system using magnetic cards such as might be employed on a college campus.

A description of the various emulation features of the present invention will now be provided, beginning with the Wiegand effect emulation feature. In accordance with the principles of the present invention, a Wiegand effect card coded in a particular manner can be replaced with a smart card onto which the same code is stored. The corresponding Wiegand effect reader, such as that shown in FIG. 1B, is replaced with the intelligent card reader of the present invention. The intelligent card reader reads the preprogrammed code from the smart card, converts the code into Wiegand effect signals, and transmits the Wiegand effect signals over wires to an external device which normally expects to receive such signals.

In order to emulate a Wiegand effect device, a Wiegand effect terminal 212 (FIG. 2) is provided. This terminal may comprise three wires, two emanating from I/O lines on microcontroller 200 and a third wire being input into microcontroller 200 from an external device such as an access control computer or parking garage gate controller. The characteristics of a Wiegand effect signal are well known and need not be described in detail here (see, for example, the following U.S. Pat. Nos.: 3,783,249; 3,866,193; 4,309,628; and 4,484,090). According to these well known principles, when a Wiegand effect card is inserted into a Wiegand effect reader, wires embedded in the card are energized to produce pulses in a sequence which corresponds to the code of the wires. The Wiegand effect reader generates a pulse train on two wires. As one example, each pulse may have a pulse width of approximately 50 microseconds, and a pulse spacing of approximately 1 millisecond. Specific pulse spacings for various Wiegand effect readers can be ascertained by capturing and analyzing the output of any of various types of commercially available readers, such as the Sensor Card model number 30387, manufactured by Sensor Engineering Co., an Echlin company.

In order to emulate a Wiegand effect signal, microcontroller 200 includes a software program which makes use of various internal timers (not shown) to generate these pulses on lines designated W0 and W1 in FIG. 2. For example, if a Wiegand effect card containing the code "42318" is replaced with a smart card 215 having this code stored in an appropriate file on the card, the intelligent card reader of FIG. 2 reads this code from the smart card and generates pulses on wires W0 and W1 corresponding to the code "42318". One of ordinary skill in the art will recognize how to generate pulses according to a desired sequence using simple timing routines in software executing in microcontroller 200. The external device coupled to lines W0 and W1 receives this signal and, in various embodiments, returns a confirmation signal on line C through terminal 212. This signal may be received by microcontroller 200 via an I/O line and used to energize red LED 223, green LED 224, or buzzer 225 in order to communicate to the user that the transaction was authorized or not.

A description of magnetic stripe emulation features will now be provided. As with the Wiegand effect emulation feature, it is assumed that a card containing a magnetic stripe (such as a bank debit card, a cafeteria meal plan card, access control card, or the like) is replaced with a smart card which is programmed with the same data which existed on the magnetic card. Thus, smart card 215 is inserted into card acceptor 201, and microcontroller 200 reads this information from the card in accordance with the particular application for which the card is used. A magnetic stripe output terminal 213 is provided for emulating signals generated by a magnetic stripe reader. The intelligent card reader such as that shown in FIG. 2 may be used to replace the existing magnetic stripe reader. The intelligent card reader couples to the existing external device, such as cash register 110 shown in FIG. 1C, so that the existing device receives a signal which appears to correspond to that read from a magnetic stripe card.

Most magnetic stripe cards include at least three "tracks" on the magnetic stripe, each track having a different data density. As the magnetic stripe is pulled across a magnetic head, two data streams are generated for each track: a clock data stream and a corresponding data stream. Therefore, the faster the card is pulled through the reader, the faster the clock signal will be generated, but the clock and data channels will be generally in sequence with each other. Some cards may include more than three tracks, recorded at different data densities. It is well within the scope of the present invention to emulate those containing more than three tracks.

According to the magnetic stripe emulation features of the present invention, a clock line and a data line are supplied as outputs from I/O pins on microcontroller 200 as shown in FIG. 2. In response to inserting smart card 215 into card acceptor 201, microcontroller 200 reads the code (corresponding to data conventionally on a magnetic stripe card) from a known file on the smart card. This code is then converted into a stream of data bits along with a corresponding clock signal. Both signals are output through terminal 213 to the external device which is compatible with a magnetic stripe reader. Because the speed at which smart card 215 is inserted into card acceptor 201 has no bearing on the clock rate to be generated as an output, a fixed clock rate may be used from microcontroller 200. As explained above, certain magnetic striped cards may include four or more tracks of data. Accordingly, magnetic stripe terminal 213 may comprise more than two wires, each pair of wires typically corresponding to a data/clock combination.

A description of the bar code emulation features of the present invention will now be provided. Generally speaking, there are two classes of bar code reading device: "wands" and "scanners". A bar code wand is a device which reads bar code symbols as a wand is dragged across the bar code; thus, the code is read once and the speed at which the code output is generated depends on the speed at which the wand is dragged across the bar code. A bar code scanner, in contrast, generates a scanning laser beam which repeatedly "scans" across the bar codes and reads the codes multiple times to "lock on" to the code. The speed at which the bar code signal is generated depends on the scanning frequency of the laser beam. The output of a "scanning" bar code reader is typically an ASCII character stream of the form:

<SOT><ASCII TEXT><EOT>.

The present invention can be used to emulate both types of devices.

As shown in FIG. 2, microcontroller 200 is coupled to a Universal Asynchronous Receiver/Transmitter (UART) 207, which provides an RS-232 terminal 214 including a transmit (TX), request-to-send (RTS), clear-to-send (CTS), and ground terminal. In response to reading a code from smart card 215 (which code corresponds to a code conventionally stored on a bar coded card such as a library card), microcontroller 200 converts this code into a serial bit stream in the form <SOT><ASCII TEXT><EOT> and provides it to UART 207. The UART converts this into appropriate signals on RS-232 terminal 214, which is preferably coupled to an external device which expects to receive a bar code signal in this format.

To implement a bar code "wand" capability, a clock and data output through terminal 213 may be used, such that pulses corresponding to the swipe of a wand over a bar code are generated. The generation of this type of pulses is well known in the art and need not be described here.

Card Compatibility Features

The manner in which the intelligent card reader of the present invention can operate with different types of smart cards will now be described. As described previously, most smart card vendors follow certain ISO standards pertaining to electrical characteristics of the cards (e.g., the placement and definition of the various electrical contact pads on each card). However, smart cards vary in their support of certain functions, and in the manner in which the functions are invoked from a device in communication with the smart card.

As a first example, the GEMPLUS MPCOS™ smart card provides file-based commands, allowing individual files to be specified by 16-character name on the card. In contrast, certain other smart cards do not provide such filename-based commands. Consequently, software in a smart card reader which needs to retrieve information from a smart card must first know what type of smart card has been inserted in order to determine how to interact with the card. A cafeteria plan, for example, which needs to retrieve a student meal plan account number from a smart card would need to either specify a particular file name (if using a card from vendor A), or to specify a particular record location (if using a card from vendor B).

As a second example, one smart card vendor may provide a command which performs a particular function such as establishing a secure session with a device. In contrast, another vendor may require the execution of two or three separate commands to perform an equivalent operation. Therefore, an application program which needs to establish such a secure session with a smart card must contain special code which accounts for the differences between the cards.

Finally, two types of smart cards may provide an identical function, but require a different method of invoking that function (e.g., different command code or name). Therefore, depending on the type of card used, an application program would need to account for such vendor-specific differences.

Figure 3:
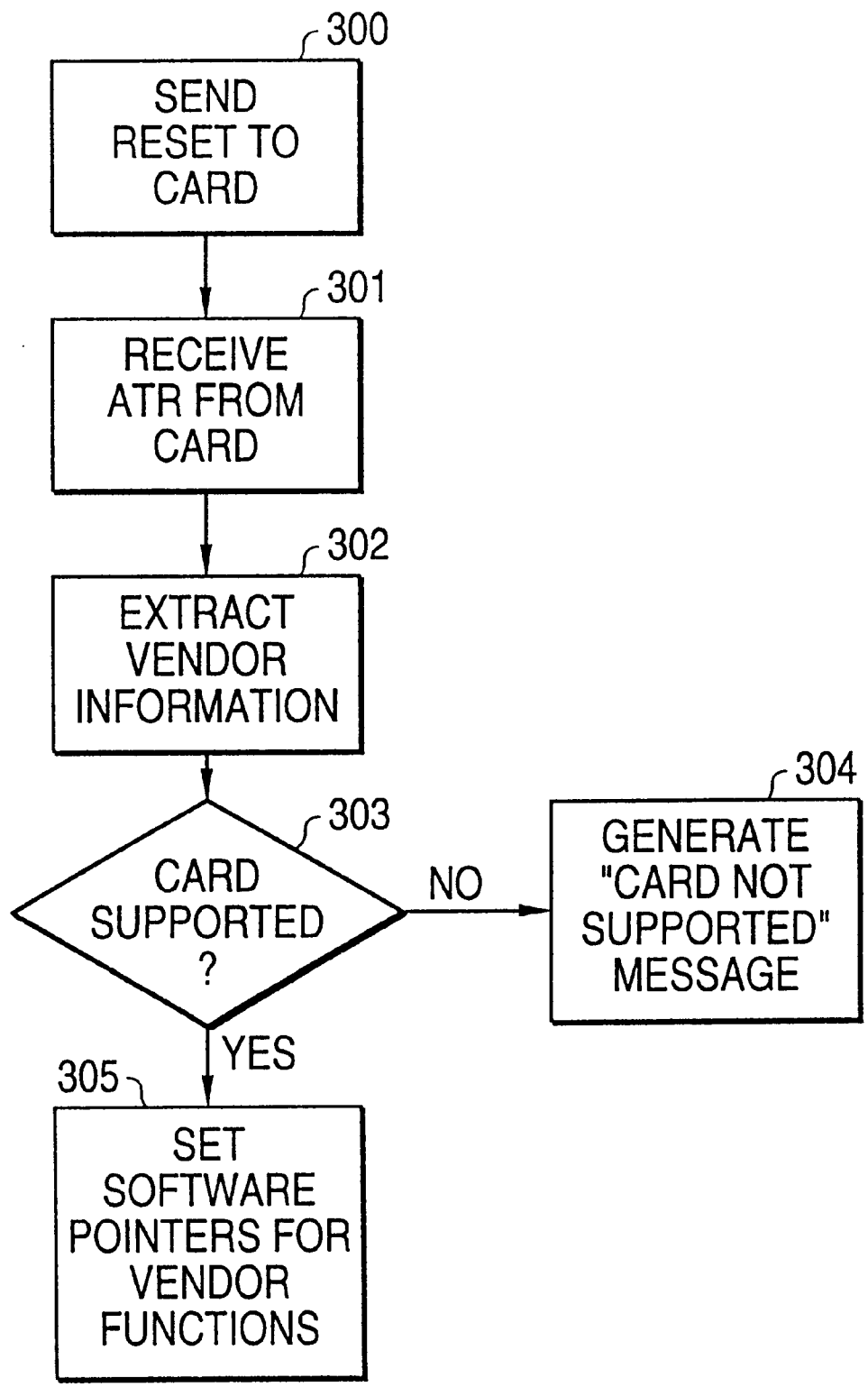
FIG. 3 shows various steps which may be executed in microcontroller 200 of FIG. 2 in order to support different types of smart cards.

To overcome the aforementioned differences, the present invention contemplates determining what type of card has been inserted into the reader and, if the functions for that card are supported, setting a set of software pointers to use routines specific to that type of smart card, while providing a generic set of smart card access functions which can be used across different types of smart cards. FIG. 3 shows various steps which can be executed in microcontroller 200 to set the intelligent card reader in a mode which will handle a particular card inserted into it, while FIG. 4 shows one possible software layering technique providing a generic card interface layer 401 which hides differences among smart card types.

Beginning in step 300 of FIG. 3, a reset signal is sent to the smart card via line 216 of FIG. 2. In accordance with the well-known ISO standard, each smart card responds to a reset signal with an "answer-to-reset" (ATR) data stream which includes, among other things, a stream of bytes including vendor information, typically embedded in the "historical" portion of the ATR stream. After receiving the ATR data in step 301, vendor information is extracted from the ATR data and compared to an internal table which indicates which vendor cards are supported. If, in step 303, the ATR data matches a supported smart card, then in step 305 software pointers are set up so that the generic card interface commands contained in layer 401 refer to the specific card routines for that type of card. On the other hand, if the card is not recognized, then in step 304 a message or other indication is generated to indicate that the inserted card is not supported.

Figure 4:
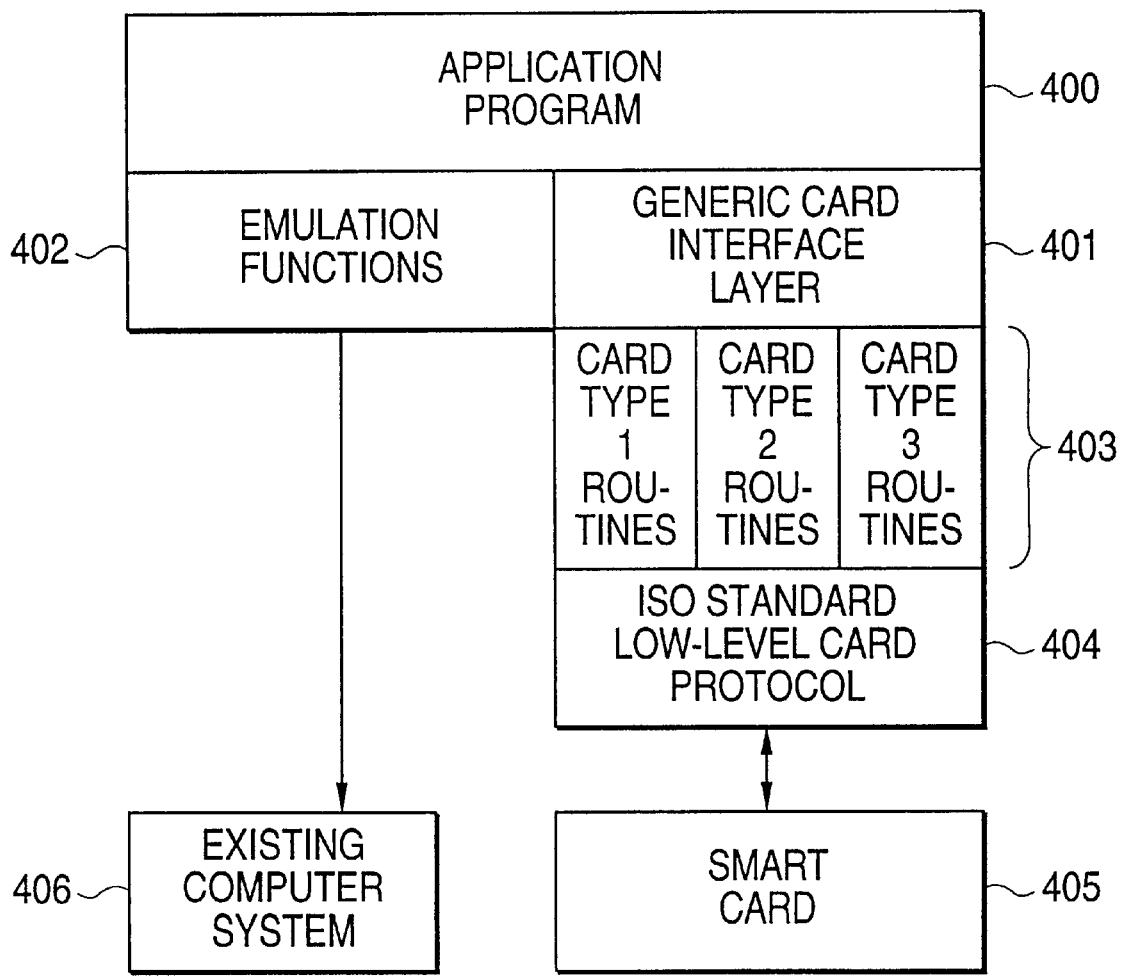
FIG. 4 shows one technique of layering software in microcontroller 200 of FIG. 2 to isolate differences among smart cards according to various aspects of the invention.

FIG. 4 shows one technique of layering software in microcontroller 200 in order to isolate differences among smart cards. It is assumed that the software shown in FIG. 4 resides in nonvolatile memory 206 (FIG. 2) from where it is fetched and executed by microcontroller 200 as needed. Application program 400, which may for example comprise an access control application which retrieves a file from a smart card and extracts an access code from the file, interfaces with a generic card interface layer 401 rather than directly coupling to various vendor functions. Generic card interface layer 401 thus provides functions which are common across different types of smart cards, such as a "create-file" function and a "retrieve-file" function. In contrast, card-specific layer 403 is partitioned into those specific functions necessary for carrying out the generic functions according to the specific type of card inserted. For example, Card Type 1 Routines shown in FIG. 4 may contain the specific functions and parameters required to interact with the GEMPLUS MPCOS™ card. Conversely, Card Type 2 Routines shown in FIG. 4 may contain the specific functions and parameters required to interact with the Schlumberger ME2000 smart card. Although the generic functions provided in layer 401 are selectively coupled to either the routines in Card Type 1 Routines or those in Card Type 2 Routines based on whether a GEMPLUS or a Schlumberger card has been inserted, application program 400 is entirely isolated from these differences and need not be changed when a new type of card is supported.

ISO standard low-level card protocol 404 is common across smart cards, and provides the low-level support needed to transfer individual bits and bytes to and from the smart card via I/O line 220 shown in FIG. 2. Finally, emulation functions 402 include those emulation features needed to convert a given data item to a magnetic stripe signal, Wiegand effect signal, or a bar code compatible signal as described above.

Reprogramming Capability

The present invention contemplates an intelligent card reader which can be reprogrammed to support new types of cards and different applications without requiring hardware changes, and even without removing the cover of the device. In this regard, various embodiments of the invention include a reprogramming interface which allows new or modified software to be downloaded into microcontroller 200 from a PC or similar device.

Referring again to FIG. 2, reprogram control circuit 208 is coupled to a reprogramming interface port 209, which may be selectively coupled to the serial port 211 of a PC 210 through four lines. Reprogram control circuit 208 is preferably arranged so that the connection of a plug to interface port 209 changes the bootstrap mode of microcontroller 200, such that upon reset microcontroller 200 reads instructions from PC 210 via interface port 209 instead of from nonvolatile memory 206. The microcontroller continues to load data from PC 210 into its internal RAM until the PC stops sending data. In this manner, the PC may download a bootstrap program which allows new programs and data to be stored into nonvolatile memory 206. When downloading is complete, the plug may be removed and the microcontroller rebooted from its own memory. Various security schemes between PC 210 and microcontroller 200 may be used to ensure that new or modified code is not improperly loaded into memory 206.

Instead of reprogramming from an externally coupled computer through interface port 209, reprogramming could be effected by inserting a smart card into card acceptor 201 and loading new code from the smart card into memory 206.

Card Reader Applications and Embodiments

Various embodiments and applications of the intelligent card reader will now be described in more detail, it being understood that one basic embodiment is shown in FIG. 2. Hereinafter, the term "intelligent card reader" or ICR will be understood to refer to various embodiments of the invention depicted in FIG. 2 and variations thereof.

On-Line Access Control Reader

Figure 5:
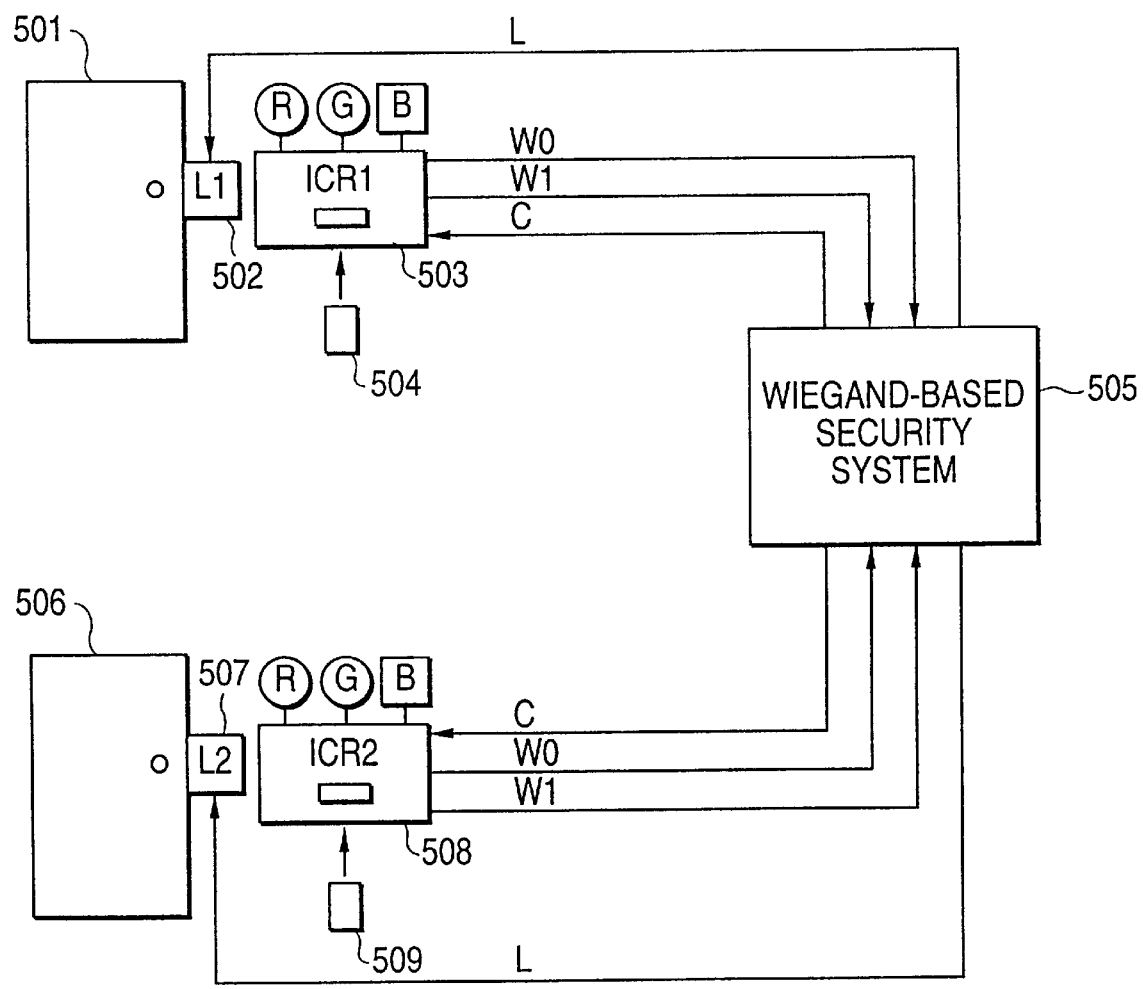
FIG. 5 shows how one embodiment of the intelligent card reader can be interfaced to an existing Wiegand-based security system in an "on-line" mode.

This embodiment of the invention contemplates the use of an intelligent card reader in conjunction with an existing Wiegand-based security system to authorize access from a central location. As shown in FIG. 5, a first door 501 is locked by an electronically-controlled lock 502. A first ICR 503 is coupled to an existing Wiegand-based security system 505, such as the Miniplex system by Thorn Industries, which can handle up to 4 Wiegand card readers and control up to 4 door locks. Door lock 502 may be opened upon an appropriate signal from security system 505. As contemplated by FIG. 2, ICR 503 accepts a smart card 504 and, after reading a predetermined file from the card, extracts a security access code from the file and generates Wiegand effect pulses corresponding to the extracted access code on two Wiegand wires coupled to security system 505. Security system 505 compares the received Wiegand effect signal (corresponding to the access code) and, if it matches a code prestored in its memory, sends a confirmation signal back to ICR 503, which preferably turns on a green LED. Additionally, security system 505 signals lock 502 to open, allowing access to the door. If, on the other hand, the access code does not match one stored in security system 505, a non-confirmation signal is sent to ICR 503, which then energizes a buzzer and/or a red LED to indicate to the user that access is not authorized. A second ICR 508 operates in a similar manner to allow access to door 506. It should be noted that each ICR preferably accepts smart cards of different types in accordance with the steps depicted in FIG. 3. As explained previously, an advantage of the approach shown in FIG. 5 is that existing Wiegand-effect readers can be replaced with intelligent card readers without the need to replace the existing Wiegand-based security system 505. In order to gain access, users need only have a smart card, which can be used for numerous other purposes other than the access control application. It is well within the scope of the claimed invention to control parking garage gates and the like.

Off-Line Access Control Reader

Figure 6:
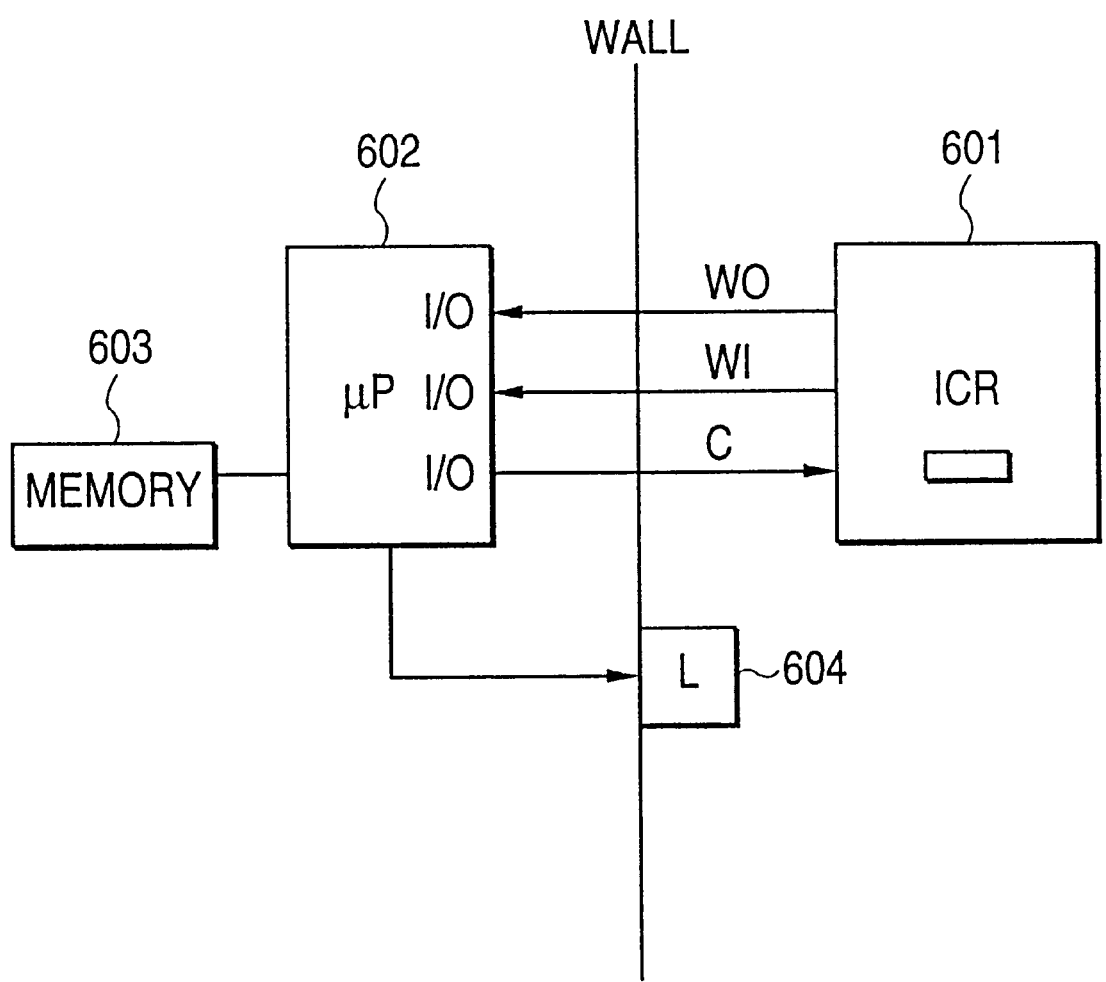
FIG. 6 shows how one embodiment of the intelligent card reader can be used to control a door lock in an "off-line" mode.

An embodiment of the present invention which uses an ICR for an off-line access control application will now be described. As shown in FIG. 6, an ICR 601 is coupled to a microprocessor 602 through a wall which supports an electronic lock 604 to prevent access through a door (not shown). Microprocessor 602 is coupled to a memory 603 (which may comprise a nonvolatile memory) into which one or more access "keys" may be stored. For example, memory 603 may contain an access key for lock 604, an access key for all locks located in a particular area or floor of a building, and an access key for an entire building.

ICR 601 may be coupled through a wall to microprocessor 602 through Wiegand emulation lines as shown in FIG. 2. The reason for splitting up ICR 601 from lock control microprocessor 602 is to prevent unauthorized tampering with the wires emanating from ICR 601. In other words, if ICR 601 were to directly control the operation of lock 604, an intruder could remove part of ICR 601 from the wall and "hotwire" the lock mechanism to gain unauthorized access. With the configuration shown in FIG. 6, the "unlock" decision is made by microprocessor 602, which unlocks lock 604 from behind the wall.

In operation, a smart card inserted into ICR 601 may be provided with one or more access control keys, such as a key only for lock 604, a key for all locks in a particular area or floor of a building, or a key for an entire building. After reading the key(s) from a smart card inserted into ICR 601, ICR 601 transmits the key(s) over Wiegand emulation wires to microprocessor 602. Microprocessor 602 compares the key(s) with those stored in memory 603 and, if a match occurs, unlocks lock 604. It should be noted that means other than the Wiegand emulation connection may be used between ICR 601 and microprocessor 602, such as RS-232, etc. Use of the Wiegand effect emulation wires, however, allows a standard type of ICR unit to be used. As with the on-line embodiment, it is well within the scope of this embodiment to control parking garage gates or other types of entry-inhibiting devices such as safes or file cabinets. The ICR can also be programmed to make access contigent on other parameters such as time of day, or day of week. The ICR can also control access by limiting the number of times or having a preprogrammed expiration date.

Vending Machine Reader

Figure 7:
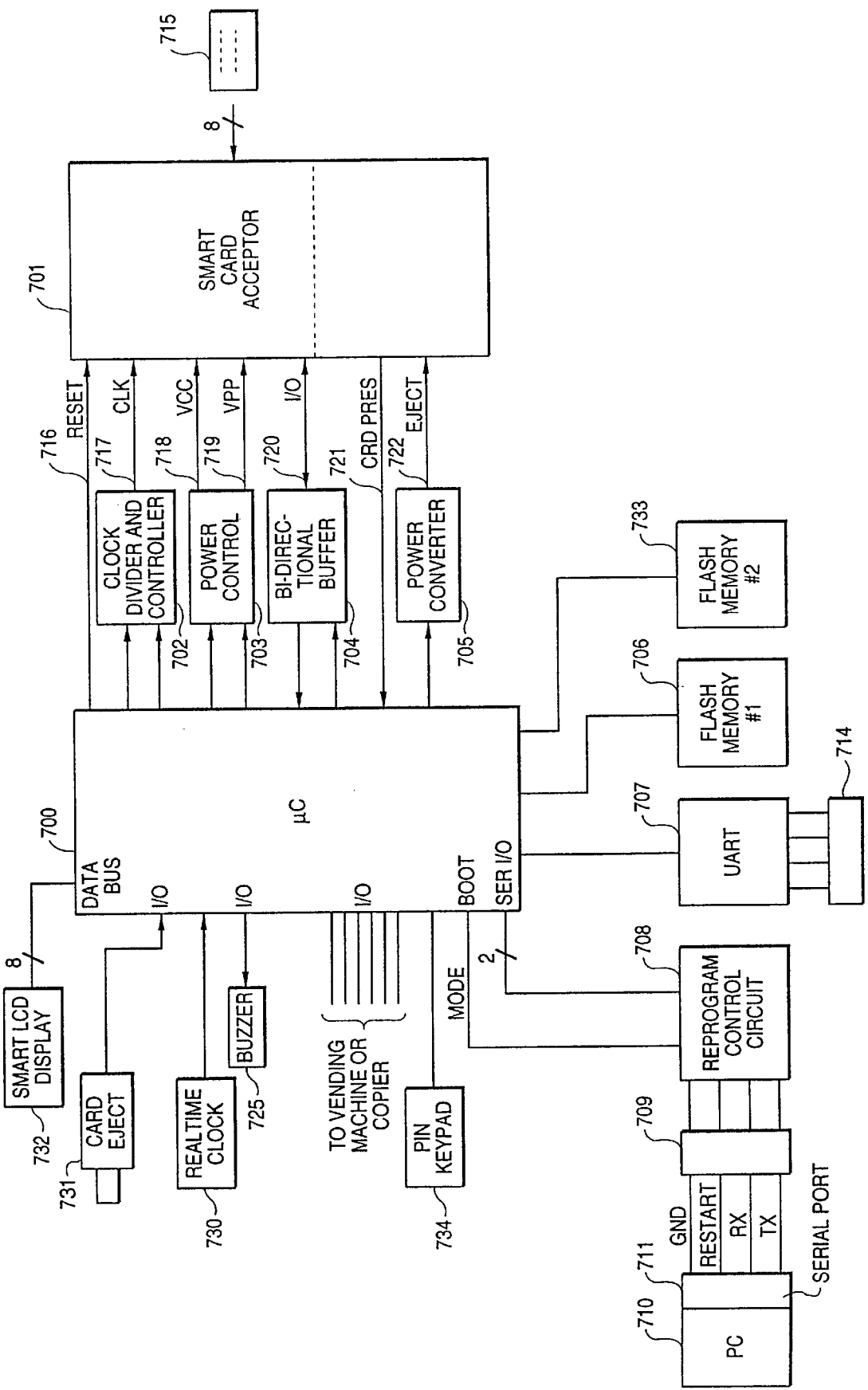
FIG. 7 illustrates an embodiment of the intelligent card reader in a vending machine control application.

FIG. 7 shows how the intelligent card reader of the present invention may be used in a vending machine to dispense items such as candy, newspapers, soft drinks, or the like. This embodiment may also be used to control a photocopy machine. The most salient differences between the embodiment of FIG. 7 and that of FIG. 2 include the addition of realtime clock 730, smart LCD unit 732, and card eject button 731, a second nonvolatile memory 733, an optional PIN keypad 734, and a plurality of control lines to the vending machine control circuits (see FIG. 8).

There are many types of known vending machine control circuits which can be tapped into to allow the intelligent card reader to control each machine. Three examples of these are the MC5000, the MC5800, and the Multi-Drop. In general, I/O lines on microcontroller 700 can be interposed between the existing coin mechanism on the vending machine and the machine control lines as depicted in FIGS. 8A–8C for the three types of vending interfaces.

Figure 8A:
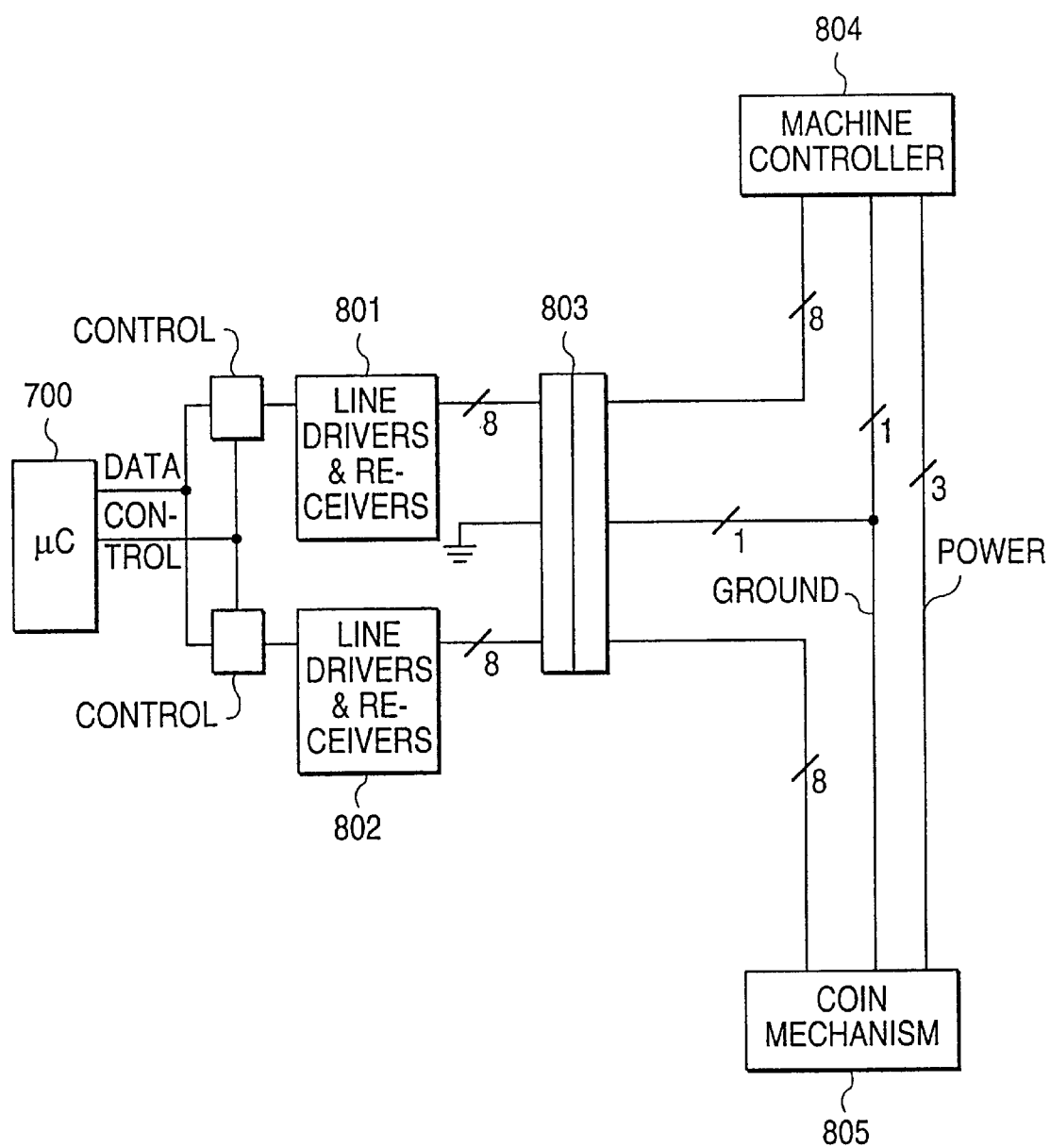
FIGS. 8A to 8C show how the system of FIG. 7 can be interfaced to different types of vending machine control circuits.
Figure 8B:
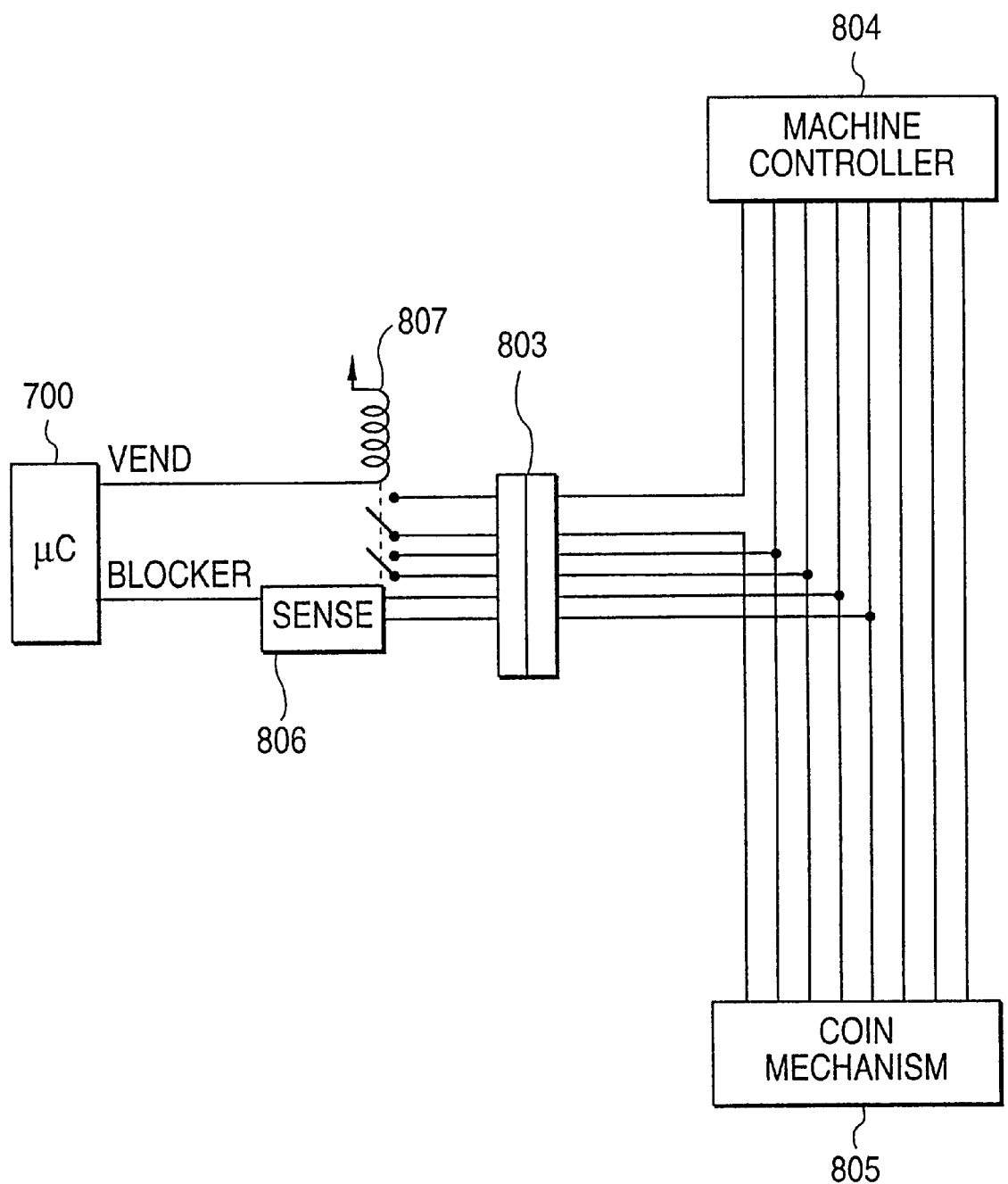
Figure 8C:
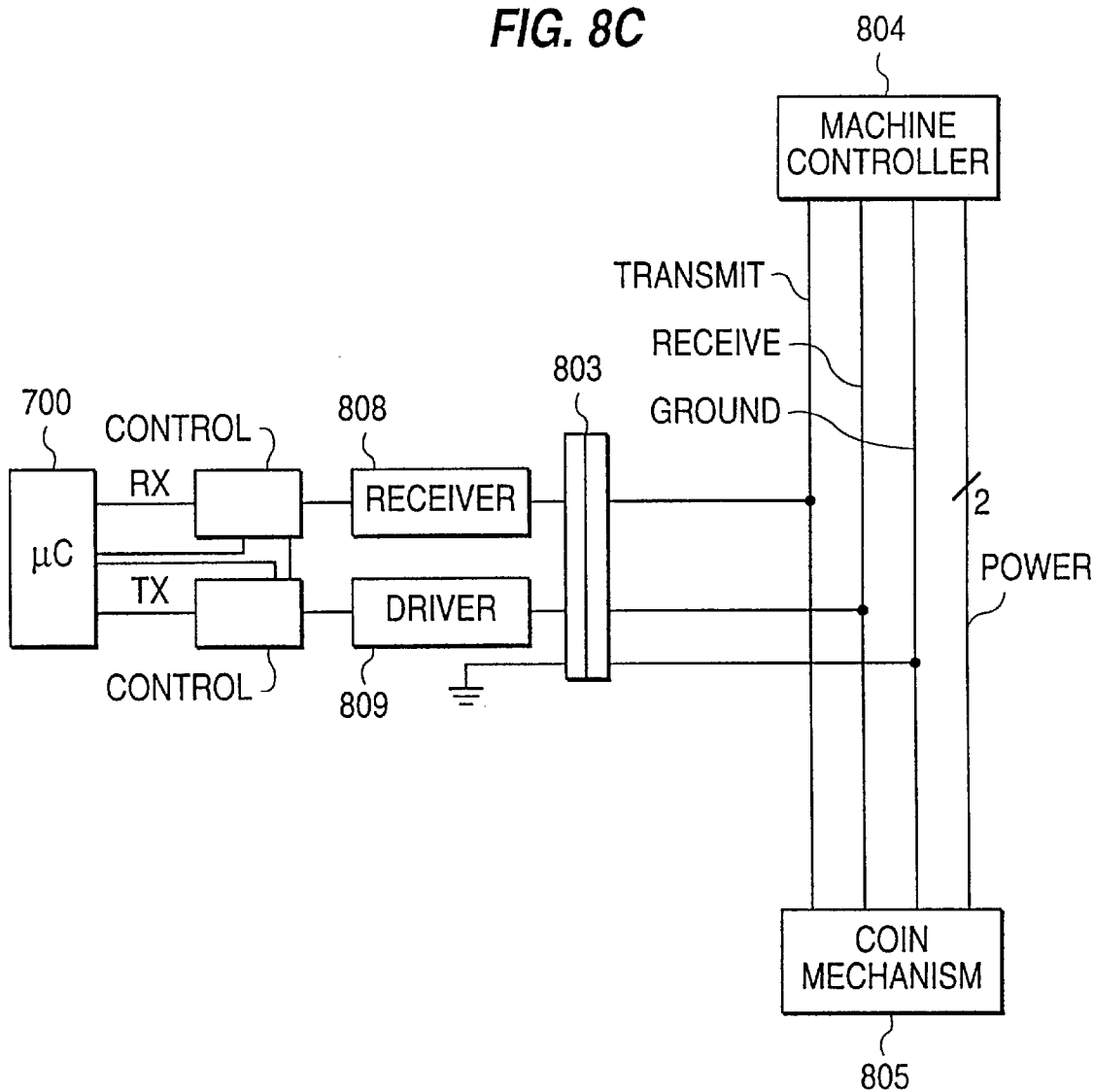

FIG. 8A shows one possible implementation for controlling a vending machine which uses the MC5000 type of interface. Machine controller 804 (part of the existing vending machine) includes an interface defined by 12 lines, three of which are power, one of which is a ground, and the remaining 8 lines used to control the vending machine itself. Coin mechanism 805 (part of the existing vending machine) connects to these 12 lines. In accordance with various embodiments, reader connector 803 is provided to intercept the 8 control lines between coin mechanism 805 and machine controller 804. Connector 803 provides the 8 control lines and a ground to line drivers and receivers 801 and 802, each respectively coupled to machine controller 804 and coin mechanism 805 through the connector. Microcontroller 700 interfaces to these line drivers and receivers to interact with the 8 control lines of the vending machine. The embodiments shown in FIG. 8B and 8C correspond to the MC5800 and Multi-drop type vending machines, respectively.

Generally, when a card is inserted, the coin mechanism can be disabled. If no card has been inserted, the normal coin mechanism signals are passed through to the machine controller 804. In this sense, the ICR controls the operation of the coin mechanism. Alternatively, the coin mechanism can be operated in conjunction with the ICR, such that a combination of coins (or bills) and value stored on a card can be used to purchase items from the machine.

One of ordinary skill in the art will recognize how control signals corresponding to the proper coin amount can be generated by microcontroller 700 for the particular vending machine controller. These vending machine interfaces are well-defined and no further elaboration is necessary here. Electronic photocopier machines have similar types of interfaces, generally simplified by the fact that a single predetermined "item" (i.e., a photocopy) is always selected.

Figure 9:
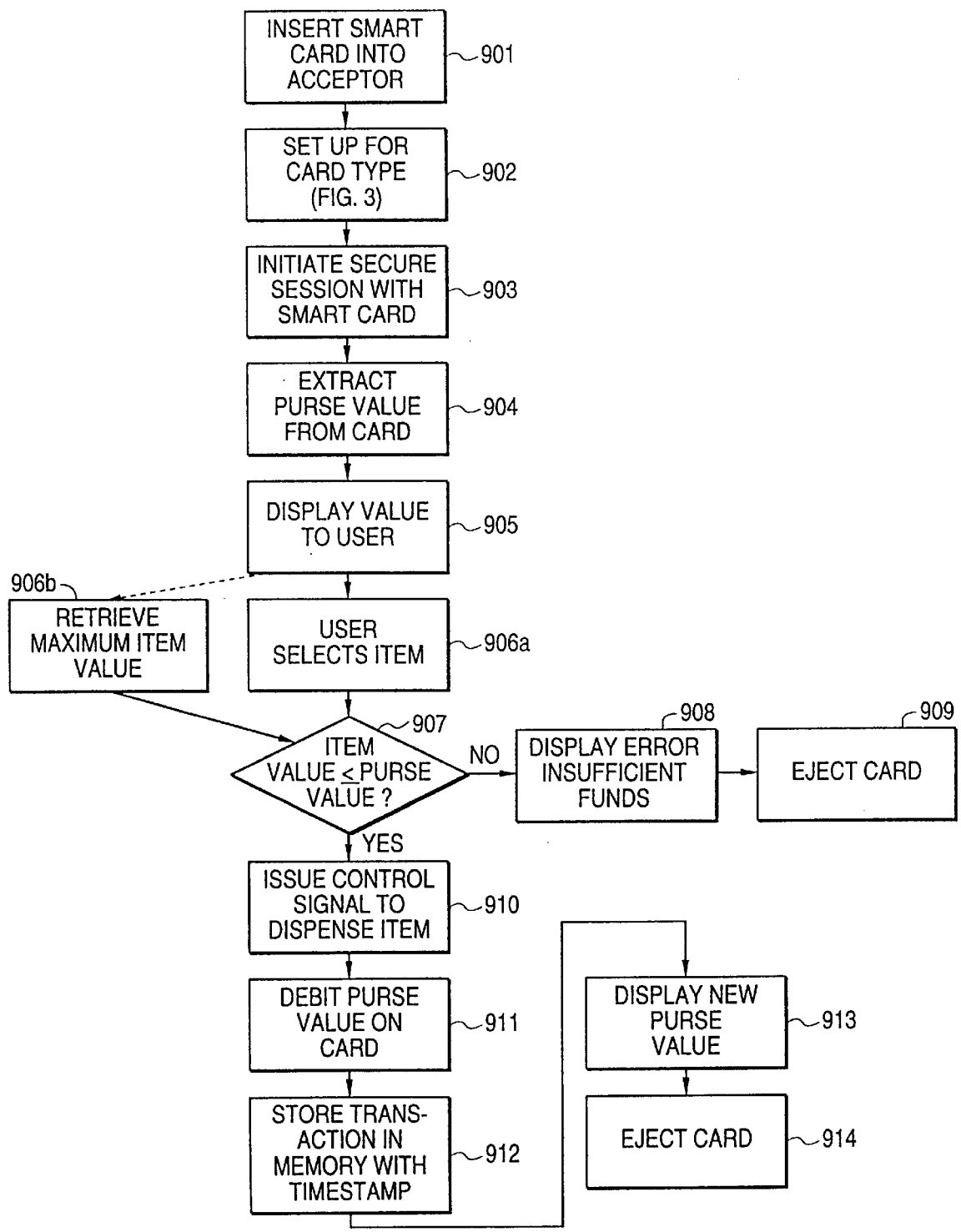
FIG. 9 shows various steps which can be executed by an application program to implement a vending machine transaction using a smart card.

FIG. 9 shows a sequence of steps which may be performed by microcontroller 700 to conduct a vending machine transaction using a smart card having an electronic "purse value" corresponding to cash previously tendered by the holder of the card. This sequence of steps can be implemented as a vending machine application program, such as program 400 shown in FIG. 4.

Beginning in step 901, the user inserts smart card 715 into card acceptor 701. In step 902, the intelligent card reader is set up to handle the particular type of smart card which was inserted, generally by executing the steps previously explained with reference to FIG. 3. In step 903, a secure session may be initiated with the smart card by exchanging encrypted data between microcontroller 700 and smart card 715. (Any of various known techniques for initiating a secure session may be used, such as executing steps including the generation of a random number, using the random number to derive a session key, encrypting the session key and transmitting it to the smart card, performing corresponding operations on the smart card, and verifying that both the smart card and the microcontroller arrive at the same key after decryption. A security Access Module (SAM), implemented in hardware or software is used to implement these functions. The details of such techniques are beyond the scope of this description.)

Once a secure session has been established with the smart card, then in step 904 a "purse value" is extracted from the card. This purse value may u correspond to an amount of cash which the card holder has previously paid and which was thereafter "installed" onto the card in a "revalue operation", described in more detail herein. Referring briefly to FIG. 4, if the particular type of card inserted directly supports purse value commands, then those commands can be used in layer 403. On the other hand, if the particular type of card inserted does not support these types of commands, then an equivalent type of command can be constructed in layer 403 using available file-type or record-type commands depending on the particular card used. In other words, application program 400 can be provided with generic purse-value commands regardless of whether the particular type of card inserted supports those commands directly or indirectly.

In step 905, the purse value extracted from the card is displayed to the user on display 732. In step 906a, the user selects an item from the vending machine, and this selection is received as an input signal on I/O lines of microcontroller 700 depending on the type of vending machine interface to which it is connected. Alternatively, in step 906b the cost of the most expensive item in the vending machine which could possibly be selected by the user is determined as the item value. Either approach (step 906a or 906b) may be used.

In step 907, a test is performed to determine whether the item value (either the selected value from step 906a or the maximum value from step 906b) is less than or equal to the purse value extracted from the smart card. If not, then in step 208 an error message is displayed on display 732, and the card is automatically ejected to the user in step 909.

In step 910, it is assumed that the item value is less than or equal to the purse value from the card, and a control signal is thus generated from microcontroller 700 to dispense the selected item. In step 911, the purse value on the card is debited to reflect the transaction, again using either an instruction native to the particular type of smart card, or an equivalent sequence of instructions which performs the debit of a known purse value file. In step 912, the transaction is preferably encrypted and stored in nonvolatile memory 733 with a timestamp generated from realtime clock 730. In step 913, the new (debited) purse value is displayed on display 732, and the card is ejected in step 914. One of ordinary skill in the art will recognize that many of the steps shown in FIG. 9 can be simplified or eliminated for the case where a photocopier (instead of a dispensing vending machine) is to be controlled.

Although not explicitly shown in the steps of FIG. 9, in various embodiments a transaction counter may be updated on the card to keep track of the total number of transactions. Additionally, a transaction control file may be stored on the smart card and updated to reflect that a particular transaction is "in progress" to prevent a transaction from being improperly aborted. Optional PIN keypad 734 may be provided in order to force a user to enter a personal identification number (PIN) to authorize transactions above a certain predetermined limit (for example, $10). Finally, the user may press card eject button 731 which will cause the current transaction to be aborted and the card returned to the user. This "abort" capability may be limited if a transaction has already been substantially performed in order to prevent the recording of partial transactions.

In various embodiments, a separate nonvolatile memory 733 having write protection features may be used to store vending transactions. This memory may be separate from nonvolatile memory 706 normally used to store application program 400 and related software.

The transactions stored in nonvolatile memory 733 may be extracted through various means, including having a maintenance person or machine restocking person connect PC 710 through reprogram control circuit jack 709, or through UART 707. This activity would be analogous to removing the money from the machine.

An automatic scheme such as a "store and forward" approach may alternatively be used to transmit transactions from memory 733 to an external computer. For example, a program executing in microcontroller 700 could automatically initiate a data communication session with an external computer such as over a telephone line or network to transmit transactions at a particular time, such as midnight of every day.

Public or Private Kiosk

Figure 10:
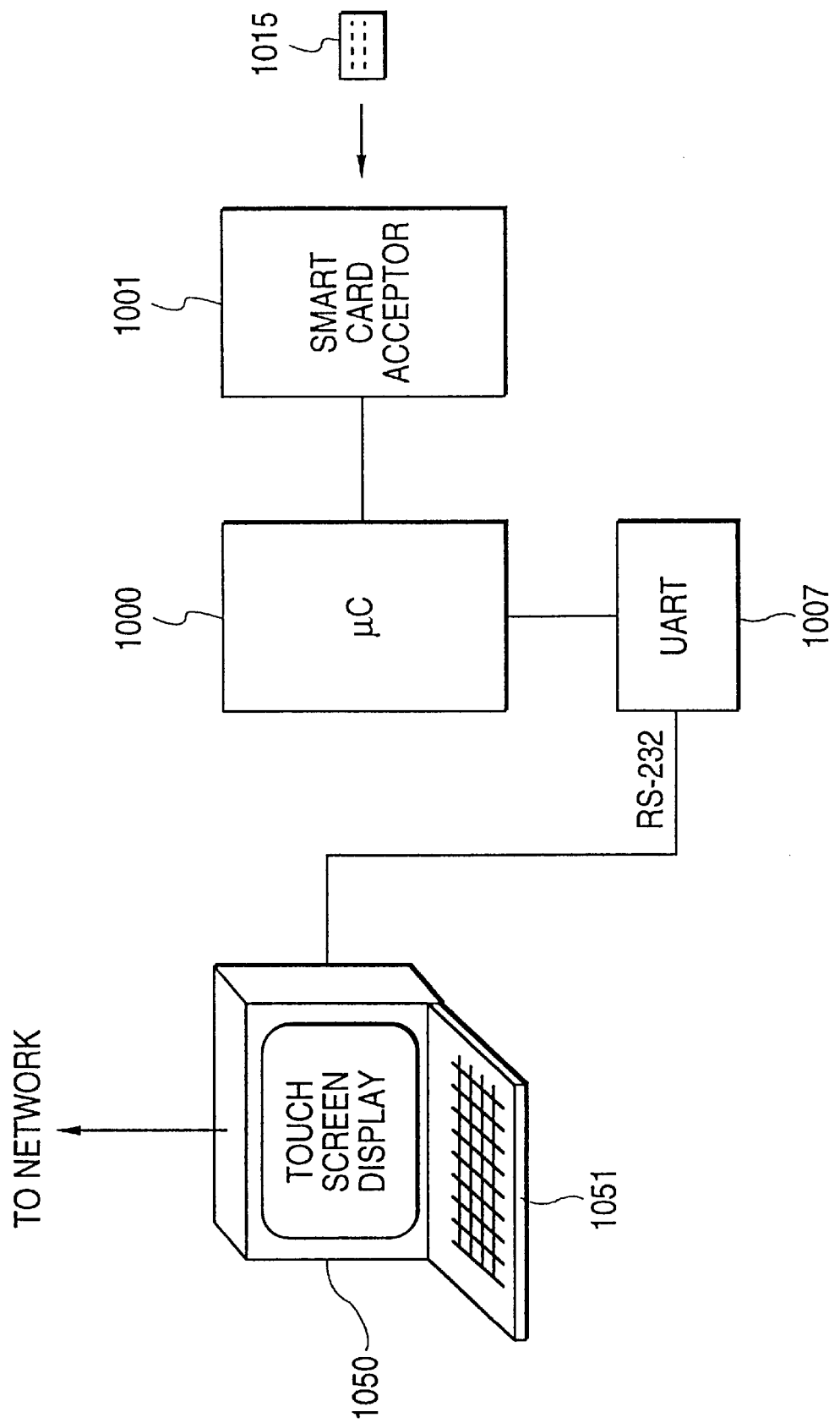
FIG. 10 shows an embodiment of the present invention in a kiosk environment.

The intelligent card reader of the present invention may be employed in a "public" kiosk similar to an ATM type device. FIG. 10 shows an embodiment of the intelligent card reader employed in such a configuration. Microcontroller 1000, smart card acceptor 1001, and UART 1007 (along with their related circuitry not shown in FIG. 10) are the same as similarly numbered elements in FIG. 2 and FIG. 7. The configuration additionally includes a computer 1050 including a touch screen display and/or a keyboard 1051. The components shown in FIG. 10 can be packaged into a case (not shown) suitable for placement in a public location such as a shopping mall, library, bank, or the like. Computer 1050 can be connected to a network such as a banking network to perform various transactions in conjunction with smart card 1015. An application program executing on computer 1050 may extract information from and provide information to smart card 1015 through microcontroller 1000.

Alternatively, a "private" kiosk may be provided by combining the components into a suitable casing which can be plugged into an available RS-232 port on a PC. In this manner, individual consumers may purchase an off-the-shelf intelligent card reader which can be connected to their PC at home. Various other configurations are possible, such as a "disk bay" configuration which allows the components to be inserted into a standard PC-type disk slot. Alternatively, a PCMCIA type configuration is possible, including the use of a commercially available adapter which accepts both microprocessor-equipped smart cards and PCMCIA cards. Such an adapter can be installed in a PC to allow the use of various features of the present invention.

Multi-Machine Controller

Figure 11:
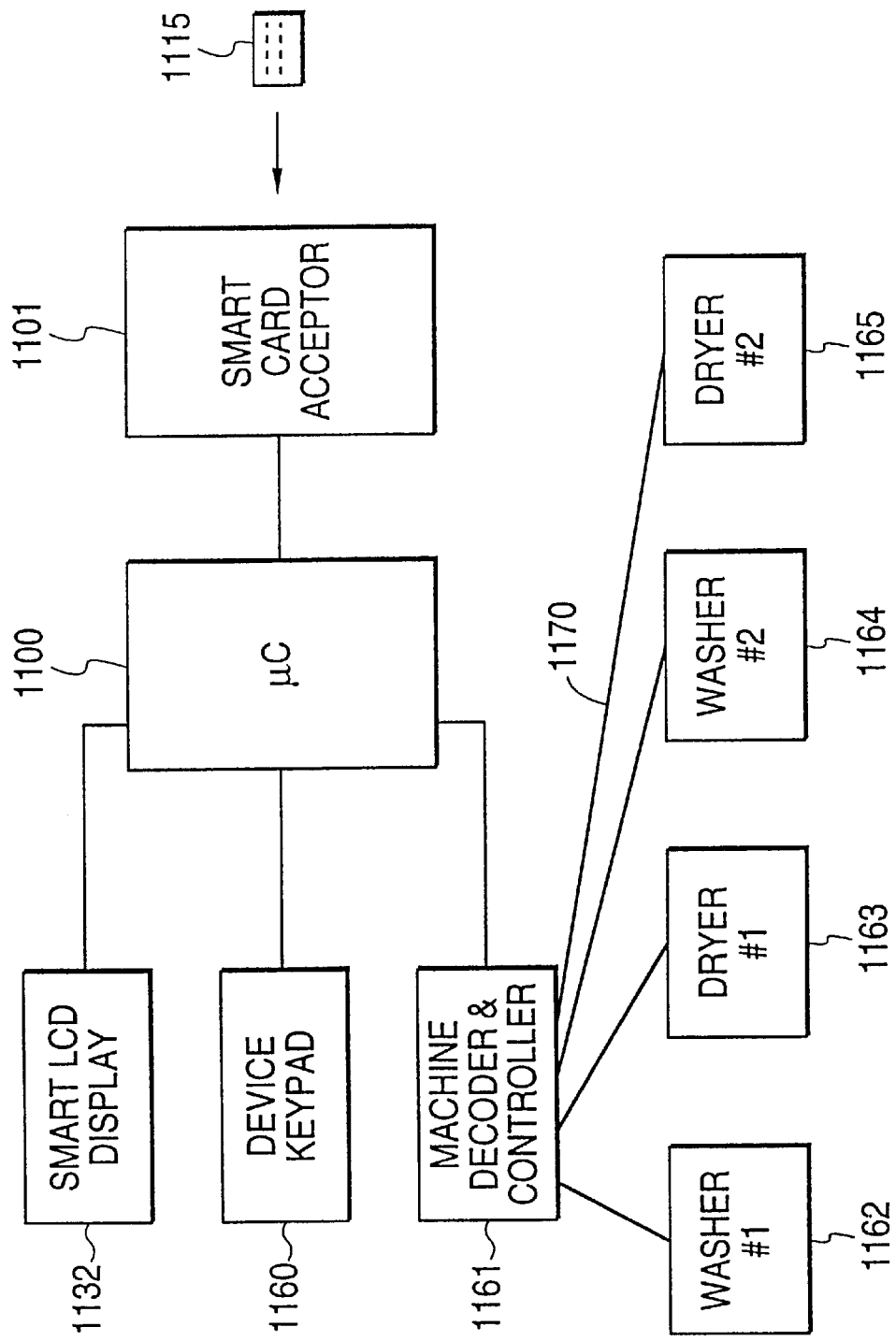
FIG. 11 shows an embodiment of the present invention in a multi-machine controller environment.

A multi-machine controller embodiment of the present invention is shown in FIG. 11. This configuration allows a single smart card reader to control multiple machines such as washing machines, photocopiers, or the like. The embodiment shown in FIG. 11 may be implemented as a variation on the vending machine embodiment previously described with reference to FIG. 7 and thus similar details are generally omitted from FIG. 11 for clarity.

The most salient differences between the vending machine embodiment of FIG. 7 and the multi-machine controller embodiment of FIG. 11 are as follows. A machine decoder and controller 1161 controls a plurality of machines, such as washing machines and dryers or the like, in response to commands generated by microcontroller 1100. Controller 1161 may control these devices over connections 1170 which may comprise hardwired lines, in-circuit lines (e.g., using RF control technology over existing electrical wiring), or even wirelessly using spread spectrum or other wireless means.

After inserting smart card 1115, steps similar to those shown in FIG. 9 may be performed to display the current purse value on display 1132 and ensure that enough value remains on the card to perform an operation such as enabling a washing machine. The user then selects a device (e.g., specifies which washing machine will be used) using device keypad 1160, and machine decoder and controller 1161 then enables that particular device. Each device may be enabled either for a particular period of time, or for one "cycle".

Card Initialization

Various embodiments of the present invention assume that each smart card which is inserted into a reader has already been programmed with appropriate information such as the crediting of values to an electronic purse, and the establishment of various files for performing various transactions. The following briefly explains one possible method of initializing each smart card such that it can be used in the intelligent card readers of the present invention.

Figure 12:
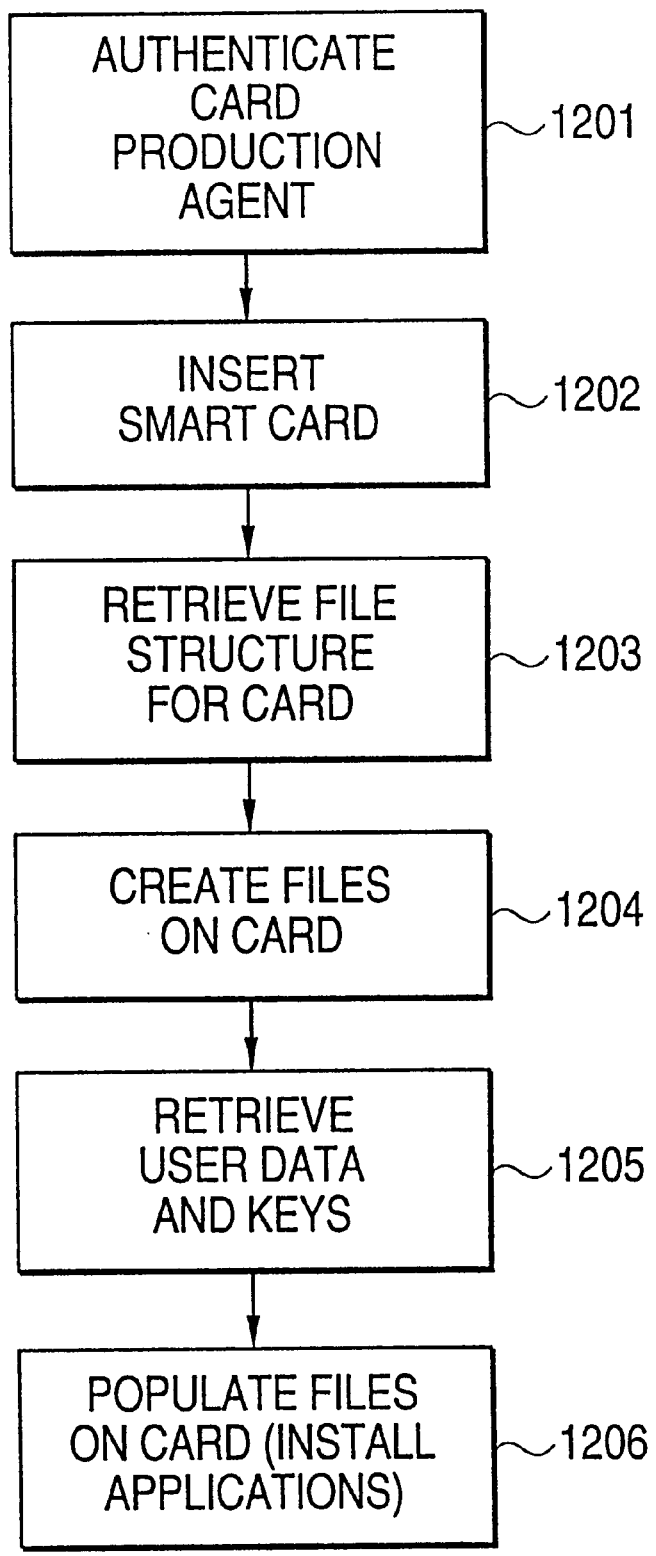
FIG. 12 shows steps which may be performed to initialize a smart card to operate with an intelligent card reader of the present invention.

FIG. 12 shows various steps which may be used to initialize a smart card from a computer having a card programming capability (a variation of the present intelligent card reader coupled to a PC could be used). Beginning in step 1201, the card production agent (i.e., the person controlling the card initialization process) is authenticated, such as by entering a PIN and/or inserting a smart card having an access control code. In step 1202, the "blank" smart card is inserted into the programming device. In step 1203, a card file structure, which may be identical for a particular site such as a college campus, is retrieved from a database.

Figure 13:
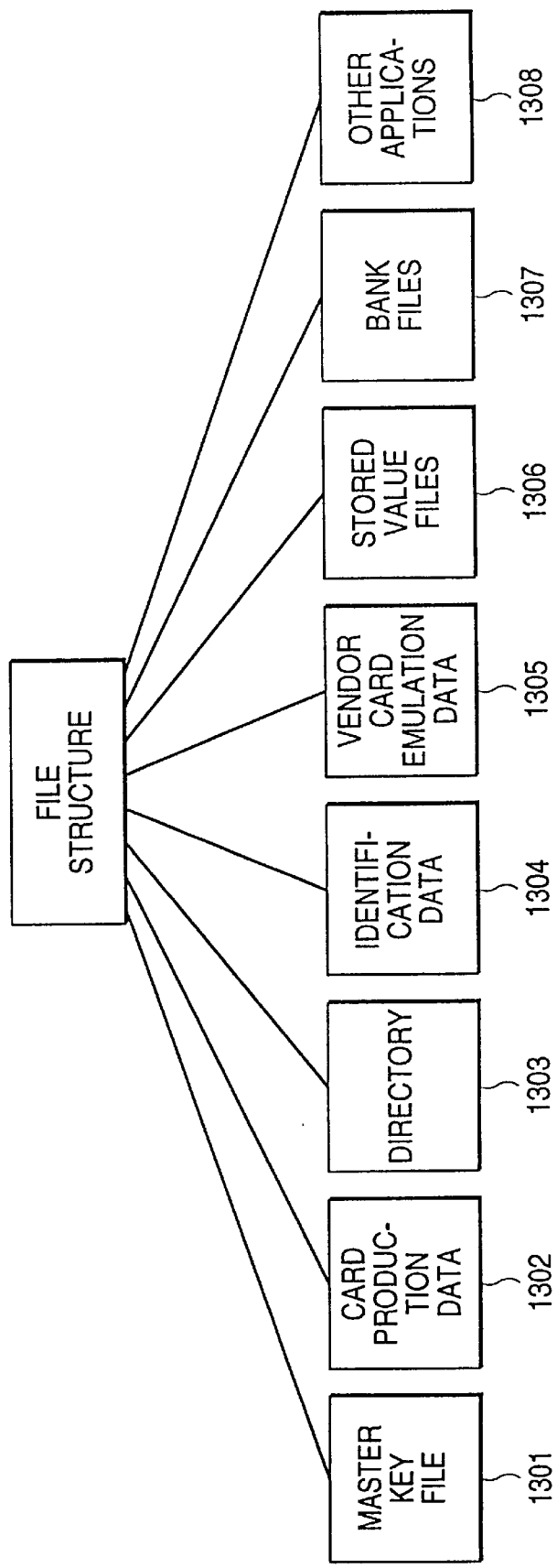
FIG. 13 shows one possible file structure for creating files on a smart card as part of the initialization process.

One possible file structure is shown in FIG. 13. A master key file 1301 is used to store encryption/decryption keys used for securely communicating with an intelligent card reader or other entities. A card production data file 1302 is used to hold information identifying the specific smart card (date of production, card type, memory size, etc.). A directory 1303 may be used to hold a list of the files and their locations in memory on the card. Identification data file 1304 may be used to store information pertaining to the particular card holder such as name, address, social security number, and the like. Vendor card emulation data files 1305 may be used to hold access control codes, meal plan identification account numbers, library account information, and the like, in order to emulate existing bar code, Wiegand effect, and magnetic stripe cards. Stored value files 1306 contain the electronic purse value, transaction files, and other information related to a stored value application such as for the vending machine application. Bank files 1307 may be used to store bank account information such as checking accounts, savings accounts, credit card accounts, and the like. Other application files 1308 may also be provided as needed. The particular file structure shown in FIG. 13 may be different for a particular site (such as a college campus site or a company-wide site). Thus, it will be recognized that many variations are of course possible, the particular file structure being selected to be compatible with the particular applications as needed.

The use of multiple purses on the same card is also possible, such that one electronic purse is used for vending machine transactions, while a different purse is used for a cafeteria plan. These multiple purses could be implemented in different files if the particular vendor-supplied smart card does not directly support multiple purses.

Referring again to FIG. 12, in step 1203 the file structure for the particular site is retrieved from a database. The file structure shown in FIG. 13 is one example of such a file structure. In step 1204, the particular files included in the file structure are created on the smart card, using appropriate file commands for the particular smart card. For those smart cards which do not. directly support file-based commands, or which do not allow files to be directly created by name, appropriate substitutions can be provided. For example, a convention can be adopted wherein the first file on the card constitutes the master key file, and the second file on the card constitutes the card production data, and so on. Similarly, differences among record structures can be overcome through appropriate data structure conventions.

In step 1205, the user data relating to the card holder for whom the smart card is intended may be retrieved from a database or manually input through a keyboard. This information could include personal information such as date of birth, address, student identification number, and the like, as well as a list of applications for which the card holder is authorized (such as an access control application, stored value application, and/or a meal plan). Additionally, any encryption keys needed for securely communicating with a card reader or other device are retrieved. Finally, in step 1206, the appropriate files on the smart card are populated with the retrieved data. If the user has already paid a predetermined amount of money for vending machine use, this amount of money may be stored into the stored value electronic purse file to install "cash" on the card.

It is apparent that multiple applications may exist on the same smart card, such that where previously a card holder needed many different types of cards to perform functions such as access control, meal plans, library functions, and vending machine operations, a single card can be provided which allows the user to access all of these functions. Additional applications can be added to an already-issued smart card by following steps similar to those outlined above.

It is apparent that many modifications and variations of the present invention are possible, and references to specific values are by example only. The method steps of the invention may be practiced in a different ordered sequence from that illustrated without departing from the scope of the invention. It is, therefore, to be understood that within the scope of the appended claims the invention may be practiced otherwise than as specifically described.

What is claimed is:

1. An intelligent card reader, comprising:
   a card acceptor for accepting a microprocessor-equipped smart card and for supplying information from the smart card;
   memory comprising an application program, a set of generic smart card functions executable by the application program and applicable to a plurality of different types of smart cards, a first set of specific smart card functions applicable to a first type of smart card, and a second set of specific smart card functions applicable to a second type of smart card;
   a microcontroller, operatively coupled between the card acceptor and the memory, for reading the information from the smart card, determining whether the smart card corresponds to the first type or the second type, and, responsive to the determination, coupling the set of generic smart card functions to one of the first and second sets of specific smart card functions; and
   a reprogramming control circuit coupled to the microprocessor.

2. The intelligent card reader according to claim 1, where the microcontroller is operatively coupled with interface circuitry between the card acceptor and the memory and comprises a reset circuit.

3. The intelligent card reader according to claim 1, where the microcontroller is operatively coupled with interface circuitry between the card acceptor and the memory and comprises a clock divider.

4. The intelligent card reader according to claim 1, where the microcontroller is operatively coupled with interface circuitry between the card acceptor and the memory and comprises a power control circuit.

5. The intelligent card reader according to claim 1, where the microcontroller is operatively coupled with interface circuitry between the card acceptor and the memory and comprises an input/output circuit.

6. The intelligent card reader according to claim 1, where the input/output circuit comprises a bidirectional buffer.

7. The intelligent card reader according to claim 1, where the microprocessor is capable of sending a card eject signal to the card acceptor.

8. The intelligent card reader according to claim 1, where the first set of specific smart card functions; allows files on the smart card to be referenced by name, and where the second set of specific smart card functions does not allow files on the smart card to be referenced by name.

9. The intelligent card reader according to claim 1, where the first set of specific smart card functions comprises a function which differs in its implementation from a corresponding function in the second set of specific smart card functions, and where the generic set of smart card functions hides the difference in implementation from the application program.

10. The intelligent card reader according to claim 1, where the information comprises answer-to-reset data supplied by the smart card in response to a reset signal generated by the microcontroller, and where the microcontroller makes the determination by extracting vendor information from a historical portion of the answer-to-reset data.

11. The intelligent card reader according to claim 1, where the application program comprises an access control application which reads an access control file from the smart card, extracts an access code therefrom, and supplies the access code to an external device.

12. The intelligent card reader according to claim 11, further comprising means for converting the access code into a signal compatible with a Wiegand effect reader and transmitting the signal to the external device.

13. The intelligent card reader according to claim 11, further comprising means for converting the access code into a signal compatible with a magnetic stripe reader and transmitting the signal to the external device.

14. The intelligent card reader according to claim 11, further comprising means for converting the access code into a signal compatible with a bar code reader and transmitting the signal to the external device.

15. The intelligent card reader according to claim 1, further comprising means coupled to the microcontroller for controlling a vending machine, and where the application program comprises means for extracting a purse value from the smart card, displaying the purse value on a display unit coupled to the microcontroller, determining whether the purse value is sufficient to operate the vending machine, and, responsive to a determination that the purse value is sufficient to operate the vending machine, controlling the vending machine to dispense an item.

16. The intelligent card reader according to claim 15, further comprising a transaction storage memory, where the application program further comprises means for storing an encrypted transaction in the transaction storage memory corresponding to the dispensed item.

17. The intelligent card reader according to claim 15, where the application program further comprising means for, responsive to a determination that the purse value is not sufficient to operate the vending machine, generating an error message for display on the display unit, and means for ejecting the smart card from the card acceptor.

18. The intelligent card reader according to claim 17, further comprising means coupled to the microcontroller for reading out transactions stored in the transaction storage memory.

19. The intelligent card reader according to claim 1, further comprising:

a computer having a touch-screen display; and means for coupling the microcontroller to the computer, where the application program communicates with a second application program executing on the computer.

20. The intelligent card reader according to claim 1, further comprising:

a machine decoder and controller, coupled to the microcontroller, for selectively enabling one of a plurality of machines; and a device keypad, coupled to the microcontroller, for allowing a user to select one of the plurality of machines;

where the application program comprises means for extracting a purse value from the smart card, displaying the purse value on a display unit coupled to the microcontroller, determining whether the purse value is sufficient to operate one of the machines, and, responsive to a determination that the purse value is sufficient to operate one of the machines, controlling the machine decoder and controller to enable the selected machine.

21. The intelligent card reader according to claim 1, where the application program comprises means for reading a library account code from the smart card, converting the library account code into a signal compatible with a bar code reader, and transmitting the signal to an external computer.

22. The intelligent card reader according to claim 1, where the application program comprises means for reading a meal plan account code from the smart card, converting the meal plan account code into a signal compatible with a magnetic stripe reader, and transmitting the signal to an external computer.

23. A vending machine comprising:

a machine controller mechanism which operates a dispenser to dispense vended items;

a smart card acceptor which accepts a smart card having electrical contact pads thereon through which information can be retrieved from the smart card;

a microprocessor having a reprogramming control circuit, coupled to the machine controller, where the microprocessor is programmed with a computer program which:

(a) determines the type of smart card inserted into the smart card acceptor on the basis of answer-to-reset data received from the smart card;

(b) based on the determination in (a), couples one of two vendor-specific sets of smart card functions particular to the type of smart card inserted to a set of generic smart card functions independent of the type of smart card inserted, where the one coupled vendor-specific set comprises smart card functions which provide access to a debit purse on the smart card but the second of the two vendor-specific sets of smart card functions does not provide such access;

(c) retrieves a purse value from the smart card inserted into the smart card acceptor and displays the purse value on a display;

(d) determines whether the purse value retrieved from the smart card inserted into the smart card acceptor is sufficient to operate the vending machine; and (e) responsive to a determination that the retrieved purse value is sufficient to operate the vending machine, controls the machine controller mechanism to dispense an item.

24. The vending machine of claim 23, further comprising:

a coin mechanism, coupled to the machine controller mechanism, which accepts money from a user to operate the machine controller mechanism; and means, coupled between the microprocessor and the coin mechanism, for disabling the coin mechanism when a smart card has been inserted into the smart card acceptor.

25. The vending machine of claim 23, further comprising:
a coin mechanism, coupled to the machine controller mechanism and to the microprocessor, which accepts money from a user to operate the machine controller mechanism; and
where the microprocessor is programmed to detect money received in the coin mechanism and to operate the machine controller mechanism on the basis of a combination of money received from the coin mechanism and the purse value retrieved from the smart card.

26. The vending machine of claim 23, where the vending machine is a photocopier which dispenses copies of an original document.

27. The vending machine of claim 23, where the vending machine dispenses food items.

28. The vending machine of claim 23, where the vending machine comprises a nonvolatile memory coupled to the microprocessor; and
where the computer program stores an encrypted transaction in the nonvolatile memory corresponding to operation of the machine controller mechanism dispensing an item.

29. The vending machine of claim 28, where the vending machine comprises means for transmitting transactions stored in the nonvolatile memory to an external computer.

30. The vending machine of claim 23, where the generic set of smart card functions, when coupled to the second set of vendor-specific smart card functions, emulates a purse function by storing information in a predetermined memory location on the smart card.

31. The vending machine of claim 23, where each smart card provides a plurality of debit purses thereon, and where the computer program accesses one of the plurality of debit purses corresponding to a vending machine application.

32. An intelligent card reader, comprising:
a card acceptor for accepting a microprocessor-equipped smart card and for supplying information from the smart card;
memory comprising an application program, a set of generic smart card functions executable by the application program and applicable to a plurality of different types of smart cards, a first set of specific smart card functions applicable to a first type of smart card, and a second set of specific smart card functions applicable to a second type of smart card;
a microcontroller is operatively coupled with interface circuitry between the card acceptor and the memory, where the interface circuitry comprises a reset circuit, a clock divider, a power control circuit, and an input/output circuit;
the microcontroller, operatively coupled between the card acceptor and the memory, for reading the information from the smart card, determining whether the smart card corresponds to the first type or the second type, and, responsive to the determination, coupling the set of generic smart card functions to one of the first and second sets of specific smart card functions; and
a reprogramming control circuit is coupled to the microprocessor.

33. The intelligent card reader according to claim 32, where the input/output circuit comprises a bidirectional buffer.

34. The intelligent card reader according to claim 32, where the microprocessor is capable of sending a card eject signal to the card acceptor.

35. The intelligent card reader according to claim 32, where the first set of specific smart card functions comprises a function which differs in its implementation from a corresponding function in the second set of specific smart chard functions, and where the generic set of smart card functions hides the difference in implementation from the application program.

36. The intelligent card reader according to claim 32, where the application program comprises an access control application which reads an access control file from the smart card, extracts an access code therefrom, and supplies the access code to an external device.

37. The intelligent card reader according to claim 32, further comprising means coupled to the microcontroller for controlling a vending machine, and where the application program comprises means for extracting a purse value from the smart card, displaying the purse value on a display unit coupled to the microcontroller, determining whether the purse value is sufficient to operate the vending machine, and, responsive to a determination that the purse value is sufficient to operate the vending machine, controlling the vending machine to dispense an item.

38. The intelligent card reader according to claim 37, further comprising a transaction storage memory, where the application program further comprises means for storing an encrypted transaction in the transaction storage memory corresponding to the dispensed item.

39. The intelligent card reader according to claim 37, the application program further comprising means for, responsive to a determination that the purse value is not sufficient to operate the vending machine, generating an error message for display on the display unit, and means for ejecting the smart card from the card acceptor.

40. The intelligent card reader according to claim 39, further comprising means coupled to the microcontroller for reading out transactions stored in the transaction storage memory.

41. The intelligent card reader according to claim 32, further comprising:
a computer having a touch-screen display; and
means for coupling the microcontroller to the computer, where the application program communicates with a second application program executing on the computer.

42. The intelligent card reader according to claim 32, further comprising:
a machine decoder and controller, coupled to the microcontroller, for selectively enabling one of a plurality of machines; and
a device keypad, coupled to the microcontroller, for allowing a user to select one of the plurality of machines;
where the application program comprises means for extracting a purse value from the smart card, displaying the purse value on a display unit coupled to the microcontroller, determining whether the purse value is sufficient to operate one of the machines, and, responsive to a determination that the purse value is sufficient to operate one of the machines, controlling the machine decoder and controller to enable the selected machine.

43. An intelligent card reader, comprising:
a card acceptor for accepting a microprocessor-equipped smart card and for supplying information from the smart card;

memory comprising an application program, a set of generic smart card functions executable by the application program and applicable to a plurality of different types of smart cards, a first set of specific smart card functions applicable to a first type of smart card, and a second set of specific smart card functions applicable to a second type of smart card;

a microcontroller is operatively coupled with interface circuitry between the card acceptor and the memory, where the interface circuitry comprises a reset circuit, a clock divider, a power control circuit, and an input/output circuit;

the microcontroller, operatively coupled between the card acceptor and the memory, for reading the information from the smart card, determining whether the smart card corresponds to the first type or the second type, and, responsive to the determination, coupling the set of generic smart card functions to one of the first and second sets of specific smart card functions; and where the first set of specific smart card functions; allows files on the smart card to be referenced by name, and where the second set of specific smart card functions does not allow files on the smart card to be referenced by name.

44. An intelligent card reader, comprising:

a card acceptor for accepting a microprocessor-equipped smart card and for supplying information from the smart card;

memory comprising an application program, a set of generic smart card functions executable by the application program and applicable to a plurality of different types of smart cards, a first set of specific smart card functions applicable to a first type of smart card, and a second set of specific smart card functions applicable to a second type of smart card;

a microcontroller is operatively coupled with interface circuitry between the card acceptor and the memory, where the interface circuitry comprises a reset circuit, a clock divider, a power control circuit, and an input/output circuit;

the microcontroller, operatively coupled between the card acceptor and the memory, for reading the information from the smart card, determining whether the smart card corresponds to the first type or the second type, and, responsive to the determination, coupling the set of generic smart card functions to one of the first and second sets of specific smart card functions;

where the information comprises answer-to-reset data supplied by the smart card in response to a reset signal generated by the microcontroller, and where the microcontroller makes the determination by extracting vendor information from a historical portion of the answer-to-reset data.

45. An intelligent card reader, comprising:

a card acceptor for accepting a microprocessor-equipped smart card and for supplying information from the smart card;

memory comprising an application program, a set of generic smart card functions executable by the application program and applicable to a plurality of different types of smart cards, a first set of specific smart card functions applicable to a first type of smart card, and a second set of specific smart card functions applicable to a second type of smart card;

a microcontroller is operatively coupled with interface circuitry between the card acceptor and the memory, where the interface circuitry comprises a reset circuit, a clock divider, a power control circuit, and an input/output circuit;

the microcontroller, operatively coupled between the card acceptor and the memory, for reading the information from the smart card, determining whether the smart card corresponds to the first type or the second type, and, responsive to the determination, coupling the set of generic smart card functions to one of the first and second sets of specific smart card functions;

where the application program comprises an access control application which reads an access control file from the smart card, extracts an access code therefrom, and supplies the access code to an external device; and means for converting the access code into a signal compatible with a Wiegand effect reader and transmitting the signal to the external device.

46. An intelligent card reader, comprising:

a card acceptor for accepting a microprocessor-equipped smart card and for supplying information from the smart card;

memory comprising an application program, a set of generic smart card functions executable by the application program and applicable to a plurality of different types of smart cards, a first set of specific smart card functions applicable to a first type of smart card, and a second set of specific smart card functions applicable to a second type of smart card;

a microcontroller is operatively coupled with interface circuitry between the card acceptor and the memory, where the interface circuitry comprises a reset circuit, a clock divider, a power control circuit, and an input/output circuit;

the microcontroller, operatively coupled between the card acceptor and the memory, for reading the information from the smart card, determining whether the smart card corresponds to the first type or the second type, and, responsive to the determination, coupling the set of generic smart card functions to one of the first and second sets of specific smart card functions;

where the application program comprises an access control application which reads an access control file from the smart card, extracts an access code therefrom, and supplies the access code to an external device; and means for converting the access code into a signal compatible with a bar code reader and transmitting the signal to the external device.

47. An intelligent card reader, comprising:

a card acceptor for accepting a microprocessor-equipped smart card and for supplying information from the smart card;

memory comprising an application program, a set of generic smart card functions executable by the application program and applicable to a plurality of different types of smart cards, a first set of specific smart card functions applicable to a first type of smart card, and a second set of specific smart card functions applicable to a second type of smart card;

a microcontroller is operatively coupled with interface circuitry between the card acceptor and the memory, where the interface circuitry comprises a reset circuit, a clock divider, a power control circuit, and an input/output circuit;

the microcontroller, operatively coupled between the card acceptor and the memory, for reading the information from the smart card, determining whether the smart card corresponds to the first type or the second type, and, responsive to the determination, coupling the set of generic smart card functions to one of the first and second sets of specific smart card functions; and where the application program comprises means for reading a library account code from the smart card, converting the library account code into a signal compatible with a bar code reader, and transmitting the signal to an external computer.

48. An intelligent card reader, comprising:

a card acceptor for accepting a microprocessor-equipped smart card and for supplying information from the smart card;

memory comprising an application program, a set of generic smart card functions executable by the application program and applicable to a plurality of different types of smart cards, a first set of specific smart card functions applicable to a first type of smart card, and a second set of specific smart card functions applicable to a second type of smart card;

a microcontroller is operatively coupled with interface circuitry between the card acceptor and the memory, where the interface circuitry comprises a reset circuit, a clock divider, a power control circuit, and an input/output circuit;

the microcontroller, operatively coupled between the card acceptor and the memory, for reading the information from the smart card, determining whether the smart card corresponds to the first type or the second type, and, responsive to the determination, coupling the set of generic smart card functions to one of the first and second sets of specific smart card functions; and where the application program comprises means for reading a meal plan account code from the smart card, converting the meal plan account code into a signal compatible with a magnetic stripe reader, and transmitting the signal to an external computer.

49. A method of reading a microprocessor-equipped smart card, comprising the steps of:

(a) storing into memory of a card reader an application program, a plurality of generic smart card functions executable by the application program without regard to smart card type, and a plurality of vendor-specific smart card functions specific to different types of smart cards;

(b) inserting the smart card into a card reader;

(c) from the card reader, determining the type of smart card inserted in step (b);

(d) on the basis of the determination in step (c), setting software pointers in the card reader to functions specific to the type of smart card inserted by binding each generic smart card function to one or more vendor-specific smart card functions;

(e) executing the application program using at least one of the generic smart card functions bound to one of the vendor-specific smart card functions; and where step (c) further comprises the steps of:
issuing a reset signal to the smart card;
receiving answer-to-reset data from the smart card;
extracting historical information from the answer-to-reset data; and
determining on the basis of the extracted historical information what type of card was inserted;

where step (e) further comprises the step of retrieving a data item from the smart card, the method further comprising the steps of:

(f) in the card reader, converting the retrieved data item into a signal compatible with an external computer; and (g) transmitting the signal to the external computer.

50. The method of claim 49, where step (a) comprises the step of storing an application program which does not communicate with any computer external to the card reader to execute the application program.

51. The method of claim 49, where step (e) comprises the step of retrieving a data item from the smart card, the method further comprising the steps of:

(f) in the card reader, converting the retrieved data item into a signal compatible with an external computer; and (g) transmitting the signal to the external computer.

52. The method of claim 49, where step (e) comprises the step of using a vendor-specific function which performs a "debit purse" function on the smart card.

53. The method of claim 49, where step (a) comprises the step of converting the retrieved data item into a plurality of pulses compatible with a Wiegand-effect signal.

54. The method of claim 49, where step (f) comprises the step of converting the retrieved data item into a bar code signal.

* * * * *

UNITED STATES PATENT AND TRADEMARK OFFICE
CERTIFICATE OF CORRECTION

PATENT NO.    : 6,223,984 B1
DATED         : May 1, 2001
INVENTOR(S)   : G. Fred Renner, et al.

It is certified that error appears in the above-identified patent and that said Letters Patent is hereby corrected as shown below:

<u>Title page,</u>
In the title, delete "Distinct Smart Card Reader Having Weigand, Magnetic Strip and Bar Code Types Emulation" and insert "Intelligent Smart Card Reader That is Compatible with Different Types of Smart Card Chip Operating Systems."

<u>Column 24, claim 53,</u>
Line 40, delete "(a)" and insert "(f)".

Signed and Sealed this

Thirteenth Day of November, 2001

*Attest:*

*Nicholas P. Godici*

NICHOLAS P. GODICI
*Attesting Officer*   *Acting Director of the United States Patent and Trademark Office*